United States Patent
Okada et al.

(10) Patent No.: US 12,418,041 B2
(45) Date of Patent: Sep. 16, 2025

(54) POSITIVE ELECTRODE ACTIVE MATERIAL FOR NON-AQUEOUS ELECTROLYTE SECONDARY BATTERY AND METHOD FOR MANUFACTURING THE SAME, POSITIVE ELECTRODE MIXED MATERIAL PASTE FOR NON-AQUEOUS ELECTROLYTE SECONDARY BATTERY, AND NON-AQUEOUS ELECTROLYTE SECONDARY BATTERY

(71) Applicant: SUMITOMO METAL MINING CO., LTD., Tokyo (JP)

(72) Inventors: Jiro Okada, Niihama (JP); Taira Aida, Niihama (JP); Tetsufumi Komukai, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 656 days.

(21) Appl. No.: 16/086,746

(22) PCT Filed: Mar. 22, 2017

(86) PCT No.: PCT/JP2017/011450
§ 371 (c)(1),
(2) Date: Sep. 20, 2018

(87) PCT Pub. No.: WO2017/164237
PCT Pub. Date: Sep. 28, 2017

(65) Prior Publication Data
US 2019/0051929 A1 Feb. 14, 2019

(30) Foreign Application Priority Data

Mar. 24, 2016 (JP) .................. 2016-060745
Jun. 15, 2016 (JP) .................. 2016-118644
Dec. 21, 2016 (JP) .................. 2016-248296

(51) Int. Cl.
*H01M 10/0525* (2010.01)
*H01M 4/02* (2006.01)
(Continued)

(52) U.S. Cl.
CPC ..... *H01M 10/0525* (2013.01); *H01M 4/0471* (2013.01); *H01M 4/131* (2013.01);
(Continued)

(58) Field of Classification Search
CPC .... H01M 4/131; H01M 4/1391; H01M 4/505; H01M 4/525; H01M 10/0525;
(Continued)

(56) References Cited

U.S. PATENT DOCUMENTS

2005/0123832 A1* 6/2005 Tsukuma ............... C01G 53/54
423/599
2005/0227147 A1 10/2005 Kogetsu et al.
(Continued)

FOREIGN PATENT DOCUMENTS

CN 1658414 A 8/2005
JP 10-302779 A 11/1998
(Continued)

OTHER PUBLICATIONS

Machine translation of Japanese Patent Publication No. 2012/256435, published Dec. 27, 2012. (Year: 2012).*
(Continued)

*Primary Examiner* — Miriam Stagg
*Assistant Examiner* — Lilia Nedialkova
(74) *Attorney, Agent, or Firm* — WHDA, LLP

(57) ABSTRACT

The present invention has an object to provide a positive electrode active material for a non-aqueous electrolyte secondary battery which can improve stability of a positive electrode mixed material paste when manufacturing the secondary battery and can increase the battery capacity and
(Continued)

improve output characteristic of the secondary battery. A method for manufacturing a positive electrode active material for a non-aqueous electrolyte secondary battery includes mixing fired powder containing lithium-metal composite oxide having a crystal structure of a layered structure with water, and drying this mixture. The fired powder includes secondary particles formed by agglomeration of primary particles. Water is mixed thereto with an amount with which pH of a supernatant obtained after 5 g of the positive electrode active material is dispersed into 100 mL of pure water followed by statically leaving the dispersion solution for 10 minutes falls within a range of 11 to 11.9 at 25° C.

17 Claims, 5 Drawing Sheets

(51) Int. Cl.
H01M 4/04 (2006.01)
H01M 4/131 (2010.01)
H01M 4/1391 (2010.01)
H01M 4/36 (2006.01)
H01M 4/505 (2010.01)
H01M 4/525 (2010.01)
H01M 10/44 (2006.01)

(52) U.S. Cl.
CPC ......... *H01M 4/1391* (2013.01); *H01M 4/364* (2013.01); *H01M 4/366* (2013.01); *H01M 10/44* (2013.01); *H01M 2004/021* (2013.01); *H01M 2004/028* (2013.01); *H01M 4/0416* (2013.01); *H01M 4/505* (2013.01); *H01M 4/525* (2013.01)

(58) Field of Classification Search
CPC ........... H01M 10/44; H01M 2004/021; H01M 2004/028; H01M 4/0416; H01M 4/0471; H01M 4/364; H01M 4/366
See application file for complete search history.

(56) References Cited

U.S. PATENT DOCUMENTS

| | | | |
|---|---|---|---|
| 2009/0280412 A1* | 11/2009 | Imanari | C01G 53/42 429/231.95 |
| 2011/0315918 A1 | 12/2011 | Kawai et al. | |
| 2014/0011090 A1 | 1/2014 | Toya et al. | |
| 2014/0057163 A1* | 2/2014 | Bae | C01G 51/52 429/211 |
| 2014/0087263 A1* | 3/2014 | Matsumoto | C01G 53/50 429/223 |
| 2014/0106228 A1 | 4/2014 | Toya et al. | |
| 2015/0034862 A1 | 2/2015 | Kifune | |
| 2015/0194662 A1* | 7/2015 | Yang | H01M 4/525 429/223 |
| 2015/0228974 A1 | 8/2015 | Kokado et al. | |
| 2016/0093885 A1 | 3/2016 | Kamata et al. | |
| 2016/0244336 A1 | 8/2016 | Toya et al. | |
| 2016/0248091 A1 | 8/2016 | Toya et al. | |
| 2016/0351902 A1* | 12/2016 | Hamanaka | H01M 4/133 |
| 2017/0012286 A1* | 1/2017 | Washida | H01M 4/505 |

FOREIGN PATENT DOCUMENTS

| | | |
|---|---|---|
| JP | 10-340726 A | 12/1998 |
| JP | 2003-31222 A | 1/2003 |
| JP | 2010-80394 A | 4/2010 |
| JP | 2011-23121 A | 2/2011 |
| JP | 2012-3891 A | 1/2012 |
| JP | 2012-28313 A | 2/2012 |
| JP | 2012-79464 A | 4/2012 |
| JP | 2012-252844 A | 12/2012 |
| JP | 2012-256435 A | 12/2012 |
| JP | 2013-84395 A | 5/2013 |
| JP | 2015-130340 A | 7/2015 |
| WO | 2012/131881 A1 | 10/2012 |
| WO | 2013/136828 A1 | 9/2013 |
| WO | 2014/181891 A1 | 11/2014 |

OTHER PUBLICATIONS

International Search Report dated Jun. 27, 2017, issued in counterpart International Application No. PCT/JP2017/011450 (5 pages).
Office Action dated Dec. 7, 2021, issued in counterpart JP application No. 2016-248296, with English translation. (8 pages).
Office Action dated Jun. 3, 2021, issued in counterpart CN application No. 201780030656.X, with English translation. (20 pages).

* cited by examiner

POSITIVE ELECTRODE ACTIVE MATERIAL FOR NON-AQUEOUS ELECTROLYTE SECONDARY BATTERY AND METHOD FOR MANUFACTURING THE SAME, POSITIVE ELECTRODE MIXED MATERIAL PASTE FOR NON-AQUEOUS ELECTROLYTE SECONDARY BATTERY, AND NON-AQUEOUS ELECTROLYTE SECONDARY BATTERY

TECHNICAL FIELD

The present invention relates to a positive electrode active material for a non-aqueous electrolyte secondary battery and a method for manufacturing the same, as well as a positive electrode mixed material paste for a non-aqueous electrolyte secondary battery and a non-aqueous electrolyte secondary battery.

BACKGROUND ART

With the recent wide spreading use of portable electronic devices such as a mobile phone and a notebook personal computer, there has been a strong demand to develop a small light secondary battery having a high energy density. In addition, there has been a strong demand to develop a secondary battery which is excellent in the output characteristic as well as the charge-discharge cycle characteristic as a battery for an electric car including a hybrid car.

As the secondary battery satisfying these requirements, a non-aqueous electrolyte secondary battery may be cited. A lithium ion secondary battery may be cited as a representative of the non-aqueous electrolyte secondary battery. The lithium ion secondary battery includes a negative electrode, a positive electrode, an electrolyte solution, and the like. Active materials of the negative and positive electrodes capable of inserting and de-inserting lithium are used.

The lithium ion secondary battery is now under active research and development. In particular, the lithium ion secondary battery using a lithium-metal composite oxide in a layered form or a spinel form can generate a high voltage of a 4-V class, so that this type of battery has been put into practical use as the battery having a high energy density.

Illustrative example of the positive electrode active material which has been proposed mainly includes: a lithium-cobalt composite oxide ($LiCoO_2$), which can be synthesized comparatively easily; a lithium-metal composite oxide ($LiNiO_2$), which uses nickel, which is a cheaper material than cobalt; a lithium-nickel-cobalt-manganese composite oxide ($LiNi_{1/3}Co_{1/3}Mn_{1/3}O_2$); and a lithium-manganese composite oxide ($LiMn_2O_4$), which uses manganese. For further improvement of the charge-discharge cycle characteristic, for example, to include lithium with the amount more than a stoichiometric composition of the metal elements such as nickel, cobalt, and manganese is effective.

The positive electrode of a non-aqueous electrolyte secondary battery is formed by applying a positive electrode mixed material paste onto an electric collector such as aluminum foil, the paste being obtained, for example, by mixing a positive electrode active material with a binder such as polyvinylidene fluoride (PVDF) and a solvent such as normal methyl-2-pyrrolidone (NMP). At this time, the lithium that is liberated from the positive electrode active material occasionally reacts in the positive electrode mixed material paste with the water included in the binder to form lithium hydroxide. The lithium hydroxide thus formed then reacts with the binder thereby sometimes causing gelation of the positive electrode mixed material paste. Gelation of the positive electrode mixed material paste causes deterioration in operability and yield. This tendency is eminent when lithium is included with the amount more than the stoichiometric ratio in the positive electrode active material as well as when the ratio of nickel is high.

Several attempts to suppress gelation of the positive electrode mixed material paste have been made. For example, Patent Literature 1 proposes the positive electrode active material for a non-aqueous electrode secondary battery whose supernatant has pH of 12.7 or lower at 25° C., the supernatant being obtained by statically leaving for 30 seconds a mixture that is obtained by stirring 5 g of $Li_xNi_{1-y}A_yO_2$ ($0.98 \leq x \leq 1.06$, $0.055 \leq y \leq 0.30$, and A represents at least one of Co and Al) in 100 g of pure water for 120 minutes. It is described that this positive electrode active material still has fluidity even 24 hours after preparation of the slurry (positive electrode mixed material paste) thereby having a good anti-gelation property.

Patent Literature 2 proposes a positive electrode composition for a non-aqueous electrolyte solution secondary battery including a positive electrode active material including a lithium-transition metal composite oxide and added particles including acidic oxide particles. It is described therein that in this positive electrode composition, lithium hydroxide formed by the reaction with the water that is included in the binder reacts preferentially with the acidic oxide thereby suppressing the reaction of the generated lithium hydroxide with the binder so that gelation of the positive electrode mixed material paste is suppressed. It is also described that the acidic oxide plays a role of a conductive agent in the positive electrode to lower a resistance of the entire positive electrode thereby contributing to improvement of the output characteristic of the battery.

Patent Literature 3 proposes a method for manufacturing a lithium ion secondary battery. The method includes: outside the composition a lithium transition-metal oxide including LiOH is prepared as the positive electrode active material; a molar quantity P of LiOH included per 1 g of the positive electrode active material is grasped; to the molar quantity P of LiOH, tungsten oxide including at least 0.05 moles in terms of the tungsten atom per 1 mole of LiOH is prepared; and the positive electrode paste is prepared by kneading the positive electrode active material and tungsten oxide together with a conductive agent and a binder in an organic solvent.

Several attempts have been made to obtain a lithium ion secondary battery which is excellent in the output characteristic and the charge-discharge cycle characteristic. For example, it is known that when the positive electrode active material is composed of the particles having a small particle diameter and a narrow particle size distribution, the output characteristic and the charge-discharge cycle characteristic can be improved. This is because particles having a small particle diameter have a large specific surface area; and thus, when this is used as the positive electrode active material, not only the reaction area with the electrolyte solution can be sufficiently ensured, but also the migration distance of the lithium ion between the positive and negative electrodes can be shortened by making the positive electrode thin, thereby enabling the decrease in the positive electrode resistance. In addition, the particles having a narrow particle size distribution can uniformize the voltage applied to the particles inside the electrode, so that the decrease in the battery capacity due to selective deterioration of the fine particles can be suppressed.

For further improvement of the output characteristic and the charge-discharge cycle characteristic, it is reported that, for example, to make the positive electrode active material a hollow structure is effective. In the positive electrode active material like this, because a reaction area with the electrolyte solution can be increased as compared with the positive electrode having a solid structure with about the same particle diameter, the positive electrode resistance can be significantly reduced.

For example, Patent Literatures 4 and 5 disclose a method for producing a transition metal composite hydroxide particle, which is a precursor to the positive electrode active material, by a precipitation reaction which is clearly separated into two stages, that is, a nuclear formation process in which a nuclear formation mainly takes place and a particle growth process in which a particle growth mainly takes place. In the methods disclosed therein, the pH value of the reaction solution is controlled in the range of 12 or higher (for example, 12.0 to 13.4, or 12.0 to 14.0) in the nuclear formation process, and the pH value in the particle growth process is controlled so as to be lower than the pH of the nuclear formation process as well as in the range of 12 or lower (for example, 10.5 to 12.0), at 25° C. in the liquid temperature standard. In addition, with regard to the reaction atmosphere, in an initial stage of the nuclear formation process and the particle growth process, an oxidative atmosphere is employed, and at a predetermined timing, it is changed to a non-oxidative atmosphere.

The transition metal composite hydroxide particles obtained with these methods have small particle diameters with a narrow particle size distribution, and they are composed of a central portion with a low density formed of fine primary particles and a shell portion with a high density formed of plate-like or needle-like primary particles. Therefore, when the transition metal composite hydroxide particles like this are fired, the central portion with a low density significantly shrinks so as to form a space portion inside thereof. This particle form of the composite hydroxide particles is succeeded to the positive electrode active material. It is considered that the secondary battery using these positive electrode active materials has improved in the capacity characteristic, the output characteristic, and the charge-discharge cycle characteristic.

With regard to improvement of the output characteristic, for example, Patent Literature 6 proposes a method for producing the positive electrode active material for a non-aqueous electrolyte secondary battery. The method includes a first process in which an alkaline solution having a tungsten compound dissolved therein is added to and mixed with lithium metal composite oxide powder containing primary particles and secondary particles formed by agglomeration of the primary particles so as to disperse W to the surface of the lithium-metal composite oxide powder or surface of the primary particles of the powder, and a second process in which the alkaline solution having a tungsten compound dissolved therein and the lithium-metal composite oxide powder is heat-treated so as to form fine particles including W and Li on the surface of the lithium metal composite oxide powder or surface of the primary particles of the powder.

It is described that according to this proposal, the positive electrode active material for a non-aqueous electrolyte secondary battery which can realize a high capacity as well as a high output can be obtained when this is used in the positive electrode material of a battery. However, although how to increase the output was studied, suppression of gelation of the positive electrode mixed material paste was not considered at all.

CITATION LIST

Patent Literature

[Patent Literature 1] Japanese Unexamined Patent Application Publication No. 2003-31222

[Patent Literature 2] Japanese Unexamined Patent Application Publication No. 2012-28313

[Patent Literature 3] Japanese Unexamined Patent Application Publication No. 2013-84395

[Patent Literature 4] International Publication No. 2012/131881

[Patent Literature 5] International Publication No. 2014/181891

[Patent Literature 6] Japanese Unexamined Patent Application Publication No. 2012-079464

SUMMARY OF INVENTION

Technical Problems

However, in the proposal of Patent Literature 1, only the condition is provided with which it can be practically judged that the positive electrode active material for a lithium secondary battery is stable in the slurry (positive electrode mixed material paste) for a long period of time; and thus, this is not sufficient for suppression of gelation of the positive electrode mixed material paste. In the proposal of Patent Literature 2, the residual acidic oxide particles may lead to a risk of breakage of a separator as well as deterioration of the safety due to this breakage. In addition, it cannot be said that gelation is sufficiently suppressed. In the proposal of Patent Literature 3, it cannot be said that problems of breakage of a separator due to the residual acidic oxide (for example, tungsten oxide) and of suppression of gelation have been solved.

When a reaction area with the electrolyte solution is increased in order to improve the output characteristic and the charge-discharge cycle characteristic in the way as being proposed in Patent Literatures 4 and 5, a new problem can emerge that gelation of the positive electrode mixed material paste is facilitated. In the proposal of Patent Literature 6, although the output characteristic is investigated, suppression of gelation of the positive electrode mixed material paste is not investigated at all. Accordingly, although suppression of gelation of the positive electrode mixed material paste and improvement of the battery characteristics were investigated in some of the foregoing proposals, it cannot be said that the problems have been solved sufficiently well.

In view of the problems mentioned above, the present invention has objects to provide: a positive electrode active material for a non-aqueous electrolyte secondary battery with which not only stability of a positive electrode mixed material paste can be improved when the non-aqueous electrolyte secondary battery is manufactured, but also an output characteristic, a cycle characteristic, and a charge-discharge capacity can be simultaneously improved and increased when the secondary battery is configured; and a method for manufacturing the positive electrode active material. In addition, the present invention has objects to provide the positive electrode mixed material paste and the non-aqueous electrolyte secondary battery, both using the positive electrode active material as mentioned above.

Solution to Problems

In order to solve the problems described above, inventors of the present invention carried out an extensive investigation on suppression of gelation of the positive electrode mixed material paste for a non-aqueous electrolyte secondary battery as well as the output characteristic thereof; and as a result, they found that pH of a lithium-metal composite oxide used as the positive electrode active material has a large effect on gelation of the positive electrode mixed material paste, and that by controlling a form of the compound that is formed by an excess lithium on the surface of the lithium-metal composite oxide particle, not only pH of the lithium-metal composite oxide can be controlled but also a reaction resistance of the positive electrode active material can be lowered thereby improving the output characteristic. In addition, by mixing the lithium-metal composite oxide with water followed by drying the resulting mixture, the form of the compound that is formed by the excess lithium can be controlled. With these findings, the present invention has been completed.

A first embodiment of the present invention provides a method for manufacturing a positive electrode active material for a non-aqueous electrolyte secondary battery, the method including: mixing fired powder containing a lithium-metal composite oxide having a crystal structure of a layered structure with water; and drying the resultant mixture obtained by the mixing. The fired powder is represented by general formula (1): $Li_sNi_{1-x-y-z}Co_xMn_yM^1_zO_2$ ($0.05 \leq x \leq 0.35$, $0 \leq y \leq 0.35$, $0 \leq z \leq 0.10$, and $0.95 \leq s \leq 1.50$, and $M^1$ represents at least one element selected from V, Mg, Mo, Nb, Ti, W, and Al), and includes secondary particles formed by agglomeration of primary particles thereof. The water is mixed thereto with an amount with which pH of a supernatant obtained after 5 g of the obtained positive electrode active material is dispersed into 100 mL of pure water followed by statically leaving the resultant dispersion solution for a period of 10 minutes falls within a range of at least 11 and up to 11.9 as measured at 25° C.

At the time when the fired powder is mixed with water, it is preferable that water be mixed by spraying in droplets having a size of 1 µm to 2,000 µm. It is preferable that the water be mixed with the amount in a range of at least 1% by mass and up to 35% by mass with regard to the fired powder. It is preferable that the water be mixed with the amount in a range of at least 0.003 g/m² and up to 0.025 g/m² with regard to a surface area of the fired powder. It is preferable that the water be mixed with the amount in a range of at least 1% by mass to up to 6% by mass with regard to the fired powder. I an average particle diameter of the fired powder is preferably in a range of at least 3 µm and up to 15 µm, and [(d90−d10)/average particle diameter] that is an indicator to show spread of the particle size distribution is preferably 0.7 or smaller. A ratio of an area occupied by a void measured by observation of a section of the fired powder is preferably at least 4.5% and up to 60% with regard to an entire sectional area of the fired powder. It is preferable that the drying be carried out at least 100° C. and up to 300° C. The fired powder is represented preferably by general formula (2): $Li_sNi_{1-x-y-z-t}Co_xMn_yM^2_zW_tO_2$ ($0.05 \leq x \leq 0.35$, $0 \leq y \leq 0.35$, $0 \leq z \leq 0.10$, $0.95 \leq s \leq 1.50$, $0.0001 \leq t \leq 0.03$, and $0.0001 \leq z+t \leq 0.10$; and $M^2$ represents at least one element selected from V, Mg, Mo, Nb, Ti, and Al).

A second embodiment of the present invention provides a positive electrode active material for a non-aqueous electrolyte secondary battery. The positive electrode active material for a non-aqueous electrolyte secondary battery includes a lithium-metal composite oxide powder having a crystal structure of a layered structure. The lithium-metal composite oxide powder is represented by general formula (1): $Li_sNi_{1-x-y-z}Co_xMn_yM^1_zO_2$ ($0.05 \leq x \leq 0.35$, $0 \leq y \leq 0.35$, $0 \leq z \leq 0.10$, and $0.95 \leq s \leq 1.50$; and $M^1$ represents at least one element selected from V, Mg, Mo, Nb, Ti, W, and Al), and includes secondary particles formed by agglomeration of primary particles thereof;

pH of a supernatant obtained after 5 g of the positive electrode active material is dispersed into 100 mL of pure water followed by statically leaving the resultant dispersion solution for a period of 10 minutes is at least 11 and up to 11.9 as measured at 25° C.; and a mass ratio of excess LiOH to excess $Li_2CO_3$ (excess LiOH/excess $Li_2CO_3$) quantified by a titration method is 0.45 or lower.

In the positive electrode active material, it is preferable that the mass ratio of the excess LiOH to the excess $Li_2CO_3$ be 0.3 or lower. It is preferable that the mass ratio of the excess LiOH to the excess $Li_2CO_3$ be 0.18 or higher, and that the amount of the excess $Li_2CO_3$ be $0.157 \times 10^{-2}$ g/m² or lower with regard to a surface area of the positive electrode active material. It is preferable that an average particle diameter thereof be in a range of at least 3 µm and up to 15 µm, and that [(d90−d10)/average particle diameter] that is an indicator to show spread of the particle size distribution be 0.7 or smaller. It is preferable that a ratio of an area occupied by a void measured in observation of a section of the lithium-metal composite oxide powder be at least 4.5% and up to 60% with regard to a sectional area of an entire lithium-metal composite oxide particle. The lithium-metal composite oxide powder is represented preferably by general formula $Li_sNi_{1-x-y-z-t}Co_xMn_yM^2_zW_tO_2$ ($0.05 \leq x \leq 0.35$, $0 \leq y \leq 0.35$, $0 \leq z \leq 0.10$, $0.95 \leq s \leq 1.50$, $0.0001 \leq t \leq 0.03$, and $0.0001 \leq z+t \leq 0.10$; and $M^2$ represents at least one element selected from V, Mg, Mo, Nb, Ti, and Al).

In a third embodiment of the present invention, a positive electrode mixed material paste for a non-aqueous electrolyte secondary battery includes the positive electrode active material for a non-aqueous electrolyte secondary battery described above.

In a fourth embodiment of the present invention, a non-aqueous electrolyte secondary battery has a positive electrode which includes the positive electrode active material for a non-aqueous electrolyte secondary battery described above.

Advantageous Effects of the Invention

According to the present invention, the positive electrode mixed material slurry with suppressed gelation thereby having high stability can be obtained; and the positive electrode active material for a non-aqueous electrolyte secondary battery can be provided. When the active material is used in the positive electrode of the battery, excellent output characteristic and cycle characteristic as well as an excellent charge-discharge capacity can be obtained. The method for manufacturing the positive electrode active material is easy and suitable for production in an industrial scale, so that an industrial value thereof is very high.

DESCRIPTION OF EMBODIMENTS

Figure 1:
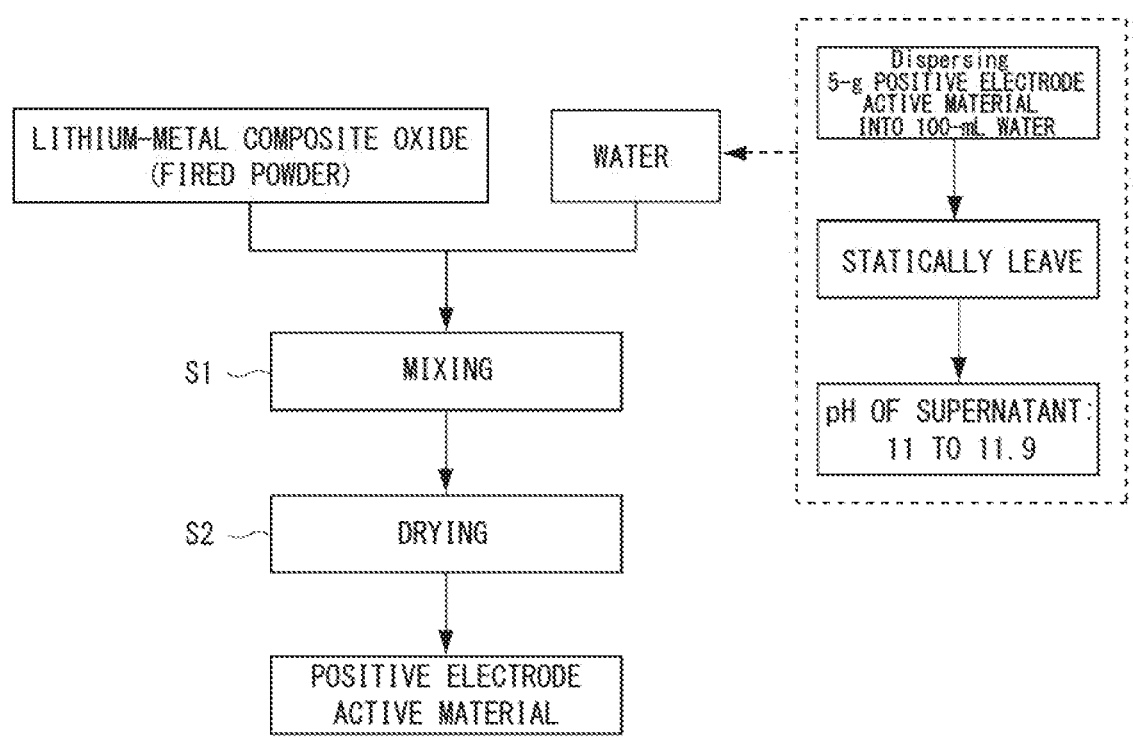
FIG. 1 illustrates one example of the method for manufacturing the positive electrode active material for a non-aqueous electrolyte secondary battery of the embodiment.

Hereunder, embodiments of the present invention will be explained with regard to: (1) a positive electrode active material for a non-aqueous electrolyte secondary battery, (2) a method for manufacturing the positive electrode active material, (3) a positive electrode mixed material paste for a non-aqueous electrolyte secondary battery using the positive electrode active material, and (4) a non-aqueous electrolyte secondary battery.

(1) Positive Electrode Active Material for a Non-Aqueous Electrolyte Secondary Battery The positive electrode active material for a non-aqueous electrolyte secondary battery of the present embodiment (hereinafter, this is sometimes referred to as "positive electrode active material") includes a lithium-metal composite oxide powder having a crystal structure of a layered structure (hereinafter, this powder is sometimes referred to as "composite oxide powder"). The lithium-metal composite oxide powder is represented by the general formula (1): $Li_sNi_{1-x-y-z}Co_xMn_yM^1{}_zO_2$ ($0.05 \leq x \leq 0.35$, $0 \leq y \leq 0.35$, $0 \leq z \leq 0.10$, and $0.95 \leq s \leq 1.50$; and $M^1$ represents at least one element selected from V, Mg, Mo, Nb, Ti, W, and Al), and includes secondary particles formed by agglomeration of primary particles thereof. In addition, pH of a supernatant obtained after 5 g of the positive electrode active material is dispersed into 100 mL of pure water followed by statically leaving the dispersion solution for a period of 10 minutes is at least 11 and up to 11.9 as measured at 25° C., and the mass ratio of the excess LiOH to the excess $Li_2CO_3$ (excess LioH/excess $Li_2CO_3$) quantified by a titration method is 0.45 or lower.

In the general formula (1), s represents the atomic ratio of Li to total of Ni, Co, Mn, and $M^1$, (Li/Me), in the lithium-metal composite oxide powder. The ratio reflects the addition amount of Li in the manufacturing process of the lithium-metal composite oxide powder. In the general formula (1), s is $0.95 \leq s \leq 1.50$, while preferably $1.00 < s < 1.30$. When the amount of Li is in the range of s, the battery capacity as well as the output characteristic of the lithium-metal composite oxide itself can be improved.

In the composite oxide powder obtained by a usual manufacturing method (for example, a lithium-nickel composite oxide powder obtained by firing a nickel composite hydroxide or a nickel composite oxide with a lithium compound), an unreacted lithium compound (excess lithium compound) is present on the surfaces of the secondary and primary particles. This excess lithium compound is eluted into the positive electrode mixed material paste (hereinafter, this is sometimes referred to as "paste") thereby increasing the pH thereof, which can occasionally cause gelation of the paste. It is also presumed that the excess lithium is also present inside the lithium-metal composite oxide powder and that this excess lithium is eluted into the paste to cause gelation of the paste. Inventors of the present invention presumed that in order to suppress gelation of the paste, suppression of elution of the excess lithium into the paste is important, and thus they focused on the form of the unreacted lithium compound that is present on the surfaces of the secondary and primary particles.

The excess lithium compound that is present on the surfaces of the secondary and primary particles includes, for example, unreacted excess LiOH (excess LiOH) and unreacted $Li_2CO_3$ (excess $Li_2CO_3$). The excess LiOH is readily eluted into the paste so that pH of the paste is increased to cause facilitation of the gelation. The excess lithium (Li) in the composite oxide powder is eluted into the paste so as to become the form of LiOH, which can increase pH of the paste thereby also causing facilitation of the gelation. Therefore, the excess LiOH means a lithium source capable of becoming the form of LiOH at the time of making the paste, so that it includes the unreacted LiOH on the surfaces of the secondary and primary particles and the excess lithium inside the composite oxide powder. On the other hand, as compared with LiOH, the excess $Li_2CO_3$ is more difficult to be eluted into the paste, so that the action thereof to cause gelation of the paste is smaller.

Accordingly, inventors of the present invention presumed that if the excess LiOH is converted to $Li_2CO_3$ so as to be immobilized as $Li_2CO_3$, elution of LiOH into the paste might be reduced thereby leading to suppression of the gelation of the paste; and on the basis of this novel idea, they completed the present invention. Namely, the positive electrode active material of the present embodiment is characterized by that the mass ratio of the excess LiOH to the excess $Li_2CO_3$ (LiOH/$Li_2CO_3$) that is quantified by a titration method is 0.45 or lower, while preferably 0.3 or lower. When LiOH/$Li_2CO_3$ is in the above-mentioned range, elution of lithium into the paste can be reduced, gelation of the paste can be suppressed, and the reaction resistance of the positive electrode active material (hereinafter, this reaction resistance is sometimes referred to as "positive electrode resistance") can be brought to a lowered state; and thus, further improved output characteristic and cycle characteristic as well as a higher initial charge-discharge capacity can be shown. The positive electrode active material of the present embodiment shows excellent characteristics not only at a normal temperature but also at a low temperature (for example, −20° C.). The lower limit of LiOH/$Li_2CO_3$ is preferably 0.10 or higher, while more preferably 0.18 or higher. When the lower limit is in the above-mentioned range, it shows that it is not in the state in which LiOH is excessively withdrawn so as to excessively produce the excess $Li_2CO_3$, so that the output characteristic as well as the cycle characteristic, especially the output characteristic at a low temperature, can be further improved. The reason for improvement of the battery characteristics by converting the excess LiOH to $Li_2CO_3$ so as to be immobilized as $Li_2CO_3$ is presumably as follows though not limited to this.

The excess LiOH is usually thinly distributed on the surfaces of the secondary and primary particles of the composite oxide. The surface of the primary particles includes not only surface of the primary particles exposed outside the secondary particle surface but also the surface of the primary particles exposed near the surface of the secondary particles or the void inside thereof which are connected to outside the secondary particles so that the electrolyte solution can be penetrated thereto. Even a grain boundary among the primary particles is included in the surface of the primary particles if it is under the state that the electrolyte solution can be penetrated thereto because of incomplete bonding of the primary particles.

Elution of Li from the excess LiOH takes place on the contact surface (surface of the primary particle) with the electrolyte solution; therefore, by converting the excess LiOH on the surface of the primary particles so as to be immobilized as the excess $Li_2CO_3$, elution of Li can be suppressed, and thereby gelation of the paste can be suppressed.

The excess LiOH present on the surface of the primary particles inhibits migration of Li between inside the crystals of the composite oxide and the electrolyte solution. Therefore, by converting the excess LiOH to the excess $Li_2CO_3$ so as to be immobilized onto the surface of the primary particle, the excess amount of LiOH can be reduced thereby removing the excess LiOH present on the surface of the primary particles or the secondary particle. With this, migration of Li is not inhibited, so that the charge-discharge capacity when it is used in a battery can be increased (hereinafter, this capacity is sometimes referred to as "battery capacity").

It is presumed that at the time when the excess LiOH is immobilized as the excess $Li_2CO_3$, the excess LiOH present on the surface of the primary particles is once removed from the surface of the primary particles so as to be eluted into added water and then it is agglomerated as the $Li_2CO_3$ on the surface of the primary particle. Therefore, an area of the excess lithium compounds (including the excess LiOH and the excess $Li_2CO_3$) that covers the surface of the primary particles is reduced, so that the contact surface between the electrolyte solution and the surface of the primary particles can be ensured; and thus, migration of Li is facilitated, resulting in reduction in the positive electrode resistance as well as the internal resistance of the secondary battery.

Because the resistance in the secondary battery is reduced, the voltage loss in the battery is reduced thereby relatively increasing the voltage that is actually applied to the load side; and thus, a high output can be obtained thereby improving the output characteristic. The positive electrode active material of the present embodiment shows excellent characteristics not only at a normal temperature but also at a low temperature (for example, at −20° C.). Because the applied voltage to the load side is increased, insertion and withdrawal of lithium in the positive electrode can take place sufficiently well, so that the battery capacity can be increased and the cycle characteristic can be improved. Moreover, because migration of Li is facilitated thereby reducing the load received by the positive electrode active material at the time of charging-discharging, the charge-discharge characteristic can be improved.

The amount of the excess LiOH in the positive electrode active material is preferably 0.15% or less by mass, while more preferably 0.12% or less by mass, with regard to the entire positive electrode active material. By lowering the amount of the excess LiOH, not only gelation of the paste can be further suppressed but also the battery capacity can be further increased.

In view of suppressing the decrease in the battery characteristics, the lower limit of the amount of the excess LiOH is preferably 0.05% or higher by mass with regard to the entire amount of the positive electrode active material. Excessive reduction of the amount of the excess LiOH indicates that lithium is excessively withdrawn from crystals of the lithium-metal composite oxide particles at the time when the excess LiOH is immobilized as $Li_2CO_3$.

The amount of the excess $Li_2CO_3$ in the positive electrode positive material is preferably $0.200 \times 10^{-2}$ $g/m^2$ or less, more preferably $0.157 \times 10^{-2}$ $g/m^2$ or less, while still more preferably $0.155 \times 10^{-2}$ $g/m^2$ or less, with regard to the surface area of the positive electrode active material. By reducing the amount of the excess $Li_2CO_3$, the contact surface between the electrolyte solution and the primary particle surface is increased thereby further facilitating migration of Li, so that the positive electrode resistance can be lowered furthermore. The lower limit of the amount of the excess $Li_2CO_3$ with regard to the surface area of the positive electrode active material is not particularly limited; however, for example, it is $0.100 \times 10^{-2}$ $g/m^2$ or more.

In the positive electrode active material of the present embodiment, pH of the supernatant thereof is at least 11 and up to 11.9 measured at 25° C., the supernatant being obtained after 5 g of the positive electrode active material is dispersed into 100 mL of pure water followed by statically leaving the dispersion solution thus obtained for a period of 10 minutes. Elution degree of lithium into the paste is evaluated by pH measurement of the supernatant that is obtained after 5 g of the positive electrode active material is dispersed into 100 mL of pure water followed by statically leaving the dispersion solution thus obtained for a period of 10 minutes.

When pH of the supernatant of the positive electrode active material at 25° C. (hereinafter, this pH is sometimes referred to as simply "pH value of the positive electrode active material") is controlled in the range of at least 11 and up to 11.9, gelation of the paste can be significantly suppressed. When pH is lower than 11, the excess $Li_2CO_3$ is excessively formed thereby leading to the state in which more than a necessary amount of lithium is withdrawn from inside the lithium-metal composite oxide; and thus, this can sometimes cause the decrease in the charge-discharge capacity and the increase in the reaction resistance of the positive electrode when it is used for the positive electrode of the battery. In view of further reduction of the positive electrode resistance by further reducing the withdrawal of lithium, the lower limit of the pH value of the positive electrode active material is preferably 11.5 or higher. On the other hand, when pH is higher than 11.9, it is in the state that elution of lithium is large when it is prepared as the paste, so that to suppress gelation of the paste is difficult. In view of further suppressing elution of lithium thereby further suppressing gelation of the paste, the upper limit of the pH value of the positive electrode active material is preferably 11.8 or lower.

The lithium-metal composite oxide particles include the secondary particles formed by agglomeration of the primary particles. The positive electrode active material may include a primary particle which exists alone. The composite oxide particles may form lithium tungstate (LW compound) to be mentioned later on the surface of the primary particle. In such a way, the output characteristic can be improved while keeping the charge-discharge capacity; and further excellent cycle characteristic can be obtained.

The lithium-metal composite oxide powder is preferably represented by the general formula (2): $Li_sNi_{1-x-y-z-t}Co_xMn_yM^2_zO_2$ ($0.05 \leq x \leq 0.35$, $0 \leq y \leq 0.35$, $0 \leq z \leq 0.10$, $0.95 \leq s \leq 1.50$, $0.0001 \leq t \leq 0.03$, and $0.0001 \leq z+t \leq 0.10$; and $M^2$ represents at least one element selected from V, Mg, Mo, Nb, Ti, and Al).

In the general formula (2), t represents the amount of tungsten (W) that is added to the lithium-metal composite oxide. In the general formula (2), t is $0.0001 \leq t \leq 0.03$, preferably $0.0003 \leq t \leq 0.02$, while more preferably $0.0003 \leq t \leq 0.012$. When W is included with the amount in the above-mentioned range t, the battery capacity and output characteristic of the lithium-metal composite oxide itself can be increased and improved. At the time when the excess LiOH is converted to $Li_2CO_3$ so as to be immobilized onto the surface of the primary particle, the eluted W into the added water reacts with the excess lithium that is eluted into water thereby forming lithium tungstate, so that the positive electrode resistance can be lowered.

In the general formula (2), s represents the atomic ratio of Li to total of Ni, Co, Mn, $M^2$, and W, (Li/Me), in the lithium-metal composite oxide powder. The ratio reflects the addition amount of Li in the manufacturing process of the lithium-metal composite oxide powder. In the general formula (2), s is preferably the same range as s in the general formula (1).

The powder characteristics and particle structure of the positive electrode active material, too, can be selected from publicly known lithium-metal composite oxides in accordance with the characteristics required in the battery. For example, the average particle diameter of the positive electrode active material is in the range of at least 3 µm and up to 15 µm, and [(d90−d10)/average particle diameter] that is an indicator to show spread of the particle size distribution is preferably 0.7 or smaller. In such a way, the filling property can be improved so that the battery capacity per volume of the battery can be increased furthermore. By uniformizing the applied voltage among the lithium-metal composite oxide particles thereby uniformizing the load among the particles, the cycle characteristic can be improved furthermore.

The above-mentioned d10 means the particle diameter at which the cumulative volume reaches 10% of the total volume of the entire particles, the cumulative volume being obtained by accumulating the particle number in each particle diameter from a side of the smaller particle diameter. The above-mentioned d90 means the particle diameter at which the cumulative volume reaches 90% of the total volume of the entire particles, the cumulative volume being obtained by similarly accumulating the particle number. The average particle diameter, d10, and d90 can be obtained from the volume cumulative value measured with a laser diffraction scattering particle size analyzer. The volume-standard average diameter Mv is used as the average particle diameter. Similarly to d10 and d90, this value can be obtained using a laser diffraction scattering particle size analyzer.

The ratio of the area occupied by the void (porosity) measured in observation of the section of the composite oxide powder is preferably at least 4.5% and up to 60% with regard to the entire sectional area of the secondary particle. When the porosity is in the above-mentioned range, reduction effect of the positive electrode resistance can be enhanced furthermore while suppressing gelation of the paste. When the porosity is lower than 4.5% with regard to the entire sectional area, sometimes the enhanced reduction effect of the positive electrode resistance cannot be obtained. On the other hand, when the porosity is higher than 60%, the filling density decreases so that sometimes a sufficient battery capacity per battery's volume cannot be obtained. The entire sectional area of the secondary particles is the sectional area including the void inside the secondary particle.

The porosity can be measured by observing an arbitrary section of the secondary particles by using a scanning electron microscope and then carrying out the image analysis thereof. Specifically, plural composite oxide particles are buried into a resin or the like, which is followed by cross-section polishing or the like so as to prepare the section sample; and after the state under which the section of the secondary particles can be observed with a scanning electron microscope, by means of an image analysis software (for example, WinRoof 6.1.1), in at least 20 secondary particles that are arbitrarily selected, the void portion of the secondary particles is detected as a black portion, and the dense portion inside the contour of the secondary particles is detected as a white portion, whereby the total area of the black and white portions of at least 20 secondary particles is measured; and then, the porosity can be calculated by calculating the area ratio of [black portion/(black portion+white portion)].

The specific surface area of the positive electrode active material is preferably at least 1 $m^2/g$ and up to 50 $m^2/g$. When the specific surface area is smaller than 1 $m^2/g$, contact thereof with the electrolyte solution is so small that sometimes a high output characteristic cannot be obtained. When the specific surface area is larger than 50 $m^2/g$, contact thereof with the electrolyte solution is too large so that sometimes suppression of gelation is not sufficient. The specific surface area can be obtained by the BET method with adsorption of a nitrogen gas.

The water content of the positive electrode active material is preferably 0.5% or lower by mass, while more preferably 0.3% or lower by mass. When the water content of the positive electrode active material is 0.5% or lower by mass, formation of a film-like lithium compound on the surface thereof by absorption of gas components including carbon and sulfur in an atmosphere can be suppressed, so that excellent battery characteristics can be obtained. The measured value of the water content is the measured value which is obtained by measurement with a Karl Fischer moisture meter under the condition of the vaporization temperature of 300° C. The lower limit of the water content is 0.01% or higher by mass.

(2) Method for Manufacturing the Positive Electrode Active Material for a Non-Aqueous Electrolyte Secondary Battery The manufacturing method of the positive electrode active material includes mixing of fired powder containing a lithium-metal composite oxide having a crystal structure of a layered structure with water (Step S1), and drying the resultant mixture obtained by the mixing (Step S2). Hereunder, each step will be explained with referring to the drawings.

FIG. 1 illustrates one example of the method for manufacturing the positive electrode active material for a non-aqueous electrolyte secondary battery of the present embodiment (hereinafter, this method is sometimes referred to as simply "manufacturing method of the positive electrode active material"). The following explanation is about one example of the manufacturing method, so that the method is not limited to this.

As illustrated in FIG. 1, in the manufacturing method of the positive electrode active material, fired powder containing a lithium-metal composite oxide having a crystal structure of a layered structure is mixed with water (Step S1). At this time, water is mixed thereto with an amount with which pH of a supernatant obtained after 5 g of the obtained positive electrode active material is dispersed into 100 mL of pure water followed by statically leaving the resultant dispersion solution for a period of 10 minutes falls within the range of at least 11 and up to 11.9 as measured at 25° C. (hereinafter, this pH is sometimes referred to as simply "pH value of the positive electrode active material").

In the mixing process (Step S1), the fired powder and water are mixed such that the pH value of the positive electrode active material may fall within the range of at least 11 and up to 11.9. In the mixing process, by mixing with a prescribed amount of water, elution of lithium into the paste can be suppressed in the paste which uses the obtained positive electrode active material. One reason for this may be presumed as follows though not limited to this. Namely, in the drying process (Step S2) to be mentioned later, the excess LiOH eluted into water reacts with carbon dioxide in an atmosphere so that the excess LiOH in the fired powder is converted to $Li_2CO_3$; and thus, the lithium derived from the excess LiOH is immobilized onto the surface of the primary particle.

In view of further reducing the withdrawal of lithium thereby reducing the positive electrode resistance furthermore, it is preferable that water be mixed such that the lower limit of the pH value of the positive electrode active material may be 11.5 or higher. On the other hand, in view of suppressing elution of lithium furthermore thereby suppressing gelation of the paste furthermore, it is preferable that water be mixed such that the upper limit of the pH value may be 11.8 or lower.

Mixing of the fired powder with water may be carried out, for example, by adding water to the fired powder followed by mixing them. The addition amount of water may be readily determined by a preliminary experiment in which a small amount of the fired powder is withdrawn so as to confirm the addition amount of water in advance. When Li/Me and the manufacturing condition of the fired powder are stabilized, the pH value of the positive electrode active material can be controlled within the above-mentioned range by the addition amount determined by the preliminary experiment.

The way to add water is not particularly limited, and therefore water may be added to the fired powder dropwise, or water may be added to the fired powder as a spray of water. Especially, it is preferable to add water to the fired powder as a spray of water with the droplet size of at least 1 μm and up to 2,000 μm. By adding water as a spray of fine droplets, water can be added to the fired powder more uniformly so that the reaction of the excess LiOH with the carbon dioxide gas in an atmosphere can be uniformized furthermore; and thus, further enhanced effects in output as well as in the gelation suppression can be obtained. With regard to the spraying method of water, various spraying devices as well as a microwave moisturizing device may be used. The droplet size of water at the time of spraying is preferably at least 1 μm and up to 2,000 μm, while more preferably at least 5 μm and up to 1,000 μm.

Mixing of the fired powder with water may be carried out after water is added to the fired powder, or with adding water; however, in order to uniformize addition of water furthermore, mixing with adding water is more preferable.

An amount of the excess LiOH fluctuates depending on the atomic ratio of Li to total of Ni, Co, Mn, and M, (Li/Me), in the fired powder of the lithium-metal composite oxide, or on the manufacturing condition of the fired powder. An addition amount of water may be such that the pH value of the positive electrode active material can be controlled within the above-mentioned range by immobilizing the excess LiOH. Accordingly, water may be added so as to bring the pH value of the positive electrode active material within the range of at least 11 and up to 11.9.

The amount of water that is mixed in the mixing process (Step S1) can be arbitrarily adjusted in accordance with the powder characteristics and the particle structure of the fired powder, whereas, for example, the amount is preferably at least 1% by mass and up to 35% by mass with regard to the fired powder. In such a way, the excess LiOH is immobilized so that elution of lithium can be reduced furthermore. By adding a sufficient amount of water, not only the water can be penetrated to the surface of the primary particles inside the lithium-metal composite oxide particles sufficiently well, but also the excess LiOH can be uniformly immobilized even among the lithium-metal composite oxide particles; and thus, the battery characteristics as well as the output characteristic can be improved furthermore. It is more preferable that the mixing amount of water be at least 1% by mass and up to 6% by mass with regard to the fired powder. By optimizing the mixing amount of water, the state that lithium is excessively withdrawn while immobilizing the excess LiOH can be avoided furthermore; and thus, the enhancement effect of the output characteristic at a normal temperature as well as at a low temperature can be maximized.

Surface area of the fired powder can fluctuate depending on the composition of the fired powder and the manufacturing condition thereof. Therefore, in order to supply a suitable amount of water even if the surface area of the fired powder fluctuates, it is more preferable that water be mixed in the range of at least 0.003 $g/m^2$ and up to 0.025 $g/m^2$ with regard to the surface area.

Even when the pH value of the fired powder of the lithium-metal composite oxide is in the range of at least 11 and up to 11.9, agglomeration due to conversion to $Li_2CO_3$ takes place on the surface of the primary particles by mixing with water, so that stabilization effect of the paste as well as the enhancement effects of the battery capacity and the output characteristic can be obtained. In this case, a mixing amount of water may be such that the pH value of the obtained positive electrode active material falls within the range of at least 11 and up to 11.9. The mixing amount is not particularly limited; however, for example, the mixing amount of water may be 1% or more by mass with regard to the fired powder.

The fired powder is represented by the general formula (1): $Li_sNi_{1-x-y-z}Co_xMn_yM^1_zO_2$ ($0.05 \le x \le 0.35$, $0 \le y \le 0.35$, $0 \le z \le 0.10$, and $0.95 \le s \le 1.50$; and M represents at least one element selected from V, Mg, Mo, Nb, Ti, W, and Al), and includes the secondary particles formed by agglomeration of the primary particles. Because the powder characteristics and particle structure of the fired powder are succeeded to the positive electrode active material, the composition, powder characteristics, particle structure, and the like of the fired powder can be made as same as those of the positive electrode active material. The fired powder may be selected in accordance with the positive electrode active material to be obtained.

The fired powder is preferably represented by the general formula (2): $Li_sNi_{1-x-y-z-t}Co_xMn_yM^2_zO_2$ ($0.05 \le x \le 0.35$, $0 \le y \le 0.35$, $0 \le z \le 0.10$, $0.95 \le s \le 1.50$, $0.0001 \le t \le 0.03$, and $0.0001 \le z+t \le 0.10$; and M represents at least one element selected from V, Mg, Mo, Nb, Ti, and Al). In the general formula (2), t which represents the amount of tungsten (W) is $0.0001 \le t \le 0.03$, preferably $0.0003 \le t \le 0.02$, while more preferably $0.0003 \le t \le 0.012$. The W which is added to the fired powder is eluted to the water that is added in the mixing process, and then reacts in the drying process with the lithium that is similarly eluted to water, thereby forming lithium tungstate on the surface of the primary particle. Because of lithium tungstate, the positive electrode resistance is reduced, so that the output characteristic is improved furthermore.

As the preferable embodiment of the fired powder, similarly to the positive electrode active material, the average particle diameter in the range of at least 3 μm and up to 15 μm and [(d90−d10)/average particle diameter] of 0.7 or smaller can be selected. [(d90−d10)/average particle diameter] is the indicator to show spread of the particle size distribution. The lower limit of [(d90−d10)/average particle diameter] is not particularly limited; however, it is about 0.25 or higher. The ratio of the area occupied by the void (porosity) measured in observation of the section of the fired powder is preferably at least 4.5% and up to 60% with regard to the sectional area of the lithium-metal composite oxide particle.

The device to be used in mixing of the fired powder with water is not particularly limited, so that publicly known devices may be used. Mixing may be carried out by using a mixing machine such as, for example, a shaker mixer, a Lodige mixer, a *Julia* mixer, and a V blender. Any mixing machine which can mix the fired powder with water sufficiently well may be used.

Next, the mixture obtained by this mixing is dried (Step S2). In this process, the mixture of the fired powder mixed with water is dried so as to form the excess LiOH (including excess lithium in the lithium-metal composite oxide particle) on the surface of the primary particles as the fine agglomerate, the excess LiOH being dissolved in water of the mixture. In this process, the excess LiOH reacts with a carbon dioxide gas ($CO_2$) in an atmosphere to form $Li_2CO_3$, which is immobilized onto the surface of the primary particles as the excess $Li_2CO_3$. Because the change takes place from the state in which the excess LiOH is thinly distributed in a wide range of the primary particle's surface to the state in which the excess $Li_2CO_3$ exists as the spots of fine agglomerates, contact of the surface of the primary particles with the electrolyte solution is ensured, so that the reaction field of the intercalation reaction of the Li ion can be increased. Removal of the excess LiOH by making spots of the excess $Li_2CO_3$ can be confirmed by the increase in the specific surface area of the lithium-metal composite oxide particle.

The drying temperature is preferably 450° C. or lower. When the temperature is above 450° C., lithium is further released from inside the crystal of the lithium-metal composite oxide, so that there is a case that gelation of the paste cannot be sufficiently suppressed. In view of more sufficient drying so as to avoid release of lithium from the lithium-metal composite oxide, the drying temperature is more preferably at least 100° C. and up to 300° C. The drying time is not particularly limited; however, it can be at least 1 hour and up to 24 hours.

With regard to the atmosphere during the time of drying, in order to avoid an excessive reaction of water and carbonic acid in the atmosphere with the lithium on the surface of the lithium-metal composite oxide particle, the atmosphere can be a decarbonized air in which a content of carbon dioxide is controlled as necessary, to an inert gas, or to an evacuate atmosphere; however, an air atmosphere is preferable. The content of carbon dioxide is preferably at least 100 ppm by volume and up to 500 ppm by volume. The atmospheric pressure during the time of drying is preferably 1 atom or lower. When the pressure is higher than 1 atom, there is a risk that content of water in the positive electrode active material cannot be lowered sufficiently. When the atmospheric pressure during the time of drying is an evacuated atmosphere (for example, about −90 kPa), the water content of the positive electrode active material can be lowered furthermore, so that the positive electrode resistance of the obtained secondary battery can be lowered.

(3) Positive Electrode Mixed Material Paste for a Non-Aqueous Electrolyte Secondary Battery In the positive electrode mixed material paste of the present embodiment, elution of lithium from the positive electrode active material is reduced so that gelation of the paste can be suppressed. Therefore, in the positive electrode mixed material paste, viscosity change of the paste is small even after being stored for a long period of time, so that it has high stability. When the positive electrode is manufactured by using the paste like this, the positive electrode is stable and can have excellent characteristics; and thus, the battery characteristics finally obtained can be made high and stable.

The positive electrode mixed material paste is characterized by that it includes the positive electrode active material mentioned above. With regard to other composition materials, the same materials as those used in the usual positive electrode mixed material paste can be used. For example, in the case where total mass of the solid portion of the positive electrode mixed material except for a solvent is 100 parts by mass, similarly to the positive electrode for a general non-aqueous electrolyte secondary battery, it is preferable that the content of the positive electrode active material be in the range of 60 parts to 95 parts by mass, the content of a conductive agent be in the range of 1 part to 20 pats by mass, and the content of a binder be in the range of 1 part to 20 parts by mass.

With regard to the conductive agent, for example, graphite (such as natural graphite, artificial graphite, and expandable graphite) as well as carbon black materials such as acetylene black and Ketchen black may be used.

The binder plays a role to bind the active material particles. For example, polyvinylidene fluoride (PVDF), polytetrafluoroethylene (PTFE), a fluorine rubber, an ethylene propylene diene rubber, styrene butadiene, a cellulose-based resin, and polyacrylic acid may be used.

As necessary, a solvent which can disperse the positive electrode active material, the conductive agent, and an activated carbon, and which can dissolve the binder is added to the positive electrode mixed material. With regard to the solvent, an organic solvent specifically such as N-methyl-2-pyrrolidone may be used. In order to increase the electric double layer capacity, an activated carbon may be added to the positive electrode mixed material.

The positive electrode mixed material paste is prepared by mixing the positive electrode active material in the form of powder, the conductive agent, and the binder, and as necessary, by further adding the activated carbon and the solvent for the purpose of viscosity control and the like, followed by kneading them.

(4) Non-Aqueous Electrolyte Secondary Battery

The non-aqueous electrolyte secondary battery of the present embodiment includes a positive electrode, a negative electrode, a non-aqueous electrolyte solution, and the like, and composed of the same composition elements as those of a general non-aqueous electrolyte secondary battery. The embodiments explained hereinafter are mere examples, so that the non-aqueous electrolyte secondary battery of the present embodiment may be carried out with the embodiments changed or modified by knowledge of a person skilled in the art on the basis of the embodiments described in the present specification. The non-aqueous electrolyte secondary battery of the present embodiment does not particularly limit the use thereof.

(a) Positive Electrode

The positive electrode of the non-aqueous electrolyte secondary battery is prepared using the positive electrode active material for a non-aqueous electrolyte secondary battery, and further by the positive electrode mixed material paste as mentioned above, by the method, for example, as described below.

The positive electrode mixed material paste is applied to the surface of an electric collector made of, for example, aluminum foil, and then it is dried to remove the solvent by evaporation. In order to increase the electrode density, it is sometimes pressed, as necessary, with a roll-press or the like. In such a way, the sheet-like positive electrode can be prepared. The sheet-like positive electrode is, for example, cut to a proper size in accordance with the target battery; and then, this can be used for preparation of the battery. However, the preparation method of the positive electrode is not limited to the above-mentioned example; it may be prepared by other method.

(b) Negative Electrode

As the negative electrode, the shaped article is used which is prepared in such a way that a negative electrode mixed material, which is obtained by mixing a binder with a metal lithium, a lithium alloy, or the like, or a negative electrode active material capable of storing and releasing the lithium ion, followed by addition of a suitable solvent so as to make it a paste-like form, is applied to the surface of an electric collector formed of metal foil such as copper foil, and then it is dried and, as necessary, compressed so as to increase the electrode density.

With regard to the negative electrode active material, for example, a natural graphite, an artificial graphite, a fired body of an organic compound such as a phenol resin, and a powdery body of a carbon substance such as cokes may be used. In this case, as the negative electrode binder, similarly to the positive electrode, among others a fluorine-containing resin such as PVDF may be used; and as the solvent to disperse the active material and binder, an organic solvent such as N-methyl-2-pyrrolidone may be used.

(c) Separator

Between the positive electrode and the negative electrode, a separator interposed therebetween is arranged. The separator separates between the positive electrode and the negative electrode, and it stores the electrolyte. The separator is a thin film made of polyethylene, polypropylene or the like; and a film having many fine pores may be used as the separator.

(d) Non-Aqueous Electrolyte Solution

The non-aqueous electrolyte solution is made by dissolving a lithium salt as a supporting salt in an organic solvent.

Illustrative example of the organic solvent includes cyclic carbonates such as ethylene carbonate, propylene carbonate, butylene carbonate, and trifluoropropylene carbonate; linear carbonates such as diethyl carbonate, dimethyl carbonate, ethyl methyl carbonate, and dipropyl carbonate; ether compounds such as tetrahydrofuran, 2-methyl tetrahydrofuran, and dimethoxy ethane; sulfur compounds such as ethyl methyl sulfone and butane sultone; and phosphorous compounds such as triethyl phosphate and trioctyl phosphate. The solvent is selected from these solvents and may be used singly or as a mixture of two or more of them.

With regard to the supporting salt, $LiPF_6$, $LiBF_4$, $LiClO_4$, $LiAsF_6$, $LiN(CF_3SO_2)_2$, and the like, or composite salts thereof may be used. Furthermore, the non-aqueous electrolyte solution may include a radical scavenger, a surfactant, a flame retardant, and so forth.

(e) Form and Composition of the Battery

The non-aqueous electrolyte secondary battery of the present embodiment, composed of the positive electrode, the negative electrode, the separator, and the non-aqueous electrolyte solution as explained above, can have various forms such as a cylindrical type form and a laminate type form.

In any forms used, the positive electrode and the negative electrode are laminated via the separator to form an electrode body; then, the electrode body thus obtained is impregnated with the non-aqueous electrolyte solution. Then, between a positive electrode collector and a positive electrode terminal leading to outside, and between a negative electrode collector and a negative electrode terminal leading to outside are connected by a collector lead or the like; and the resulting structural body is sealed in a battery case thereby completing the non-aqueous electrolyte secondary battery.

(f) Characteristics

The non-aqueous electrolyte secondary battery using the positive electrode active material of the present embodiment can have a high capacity and a high output.

In the non-aqueous electrolyte secondary battery using the positive electrode active material of the present embodiment that is obtained by an especially preferable embodiment, when this is used, for example, in the positive electrode of a 2032 coin-type battery described in Example, a high initial discharge capacity of 150 mAh/g or higher as well as a low positive electrode resistance can be obtained.

Figure 2:
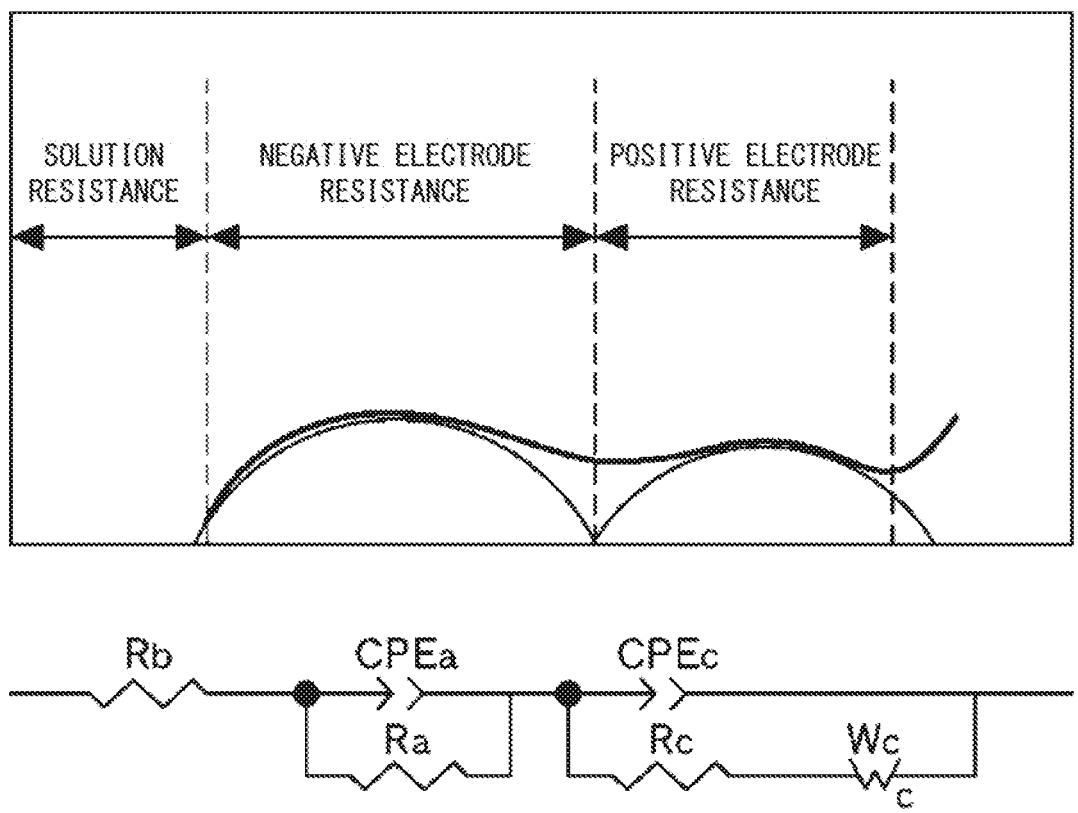
FIG. 2 illustrates a measurement example of the impedance evaluation and a schematic explanatory drawing of the equivalent circuit used for the analysis.

An example of the measurement method of the positive electrode resistance in the present embodiment is as follows. When the frequency dependence of the cell reaction is measured with an alternating current impedance method generally used as an electrochemical evaluation method, the Nyquist diagram based on the solution resistance, the negative electrode resistance, the negative electrode capacity, the positive electrode resistance, and the positive electrode capacity can be obtained as illustrated in FIG. 2.

The cell reaction in the electrode includes a resistance component accompanied with the charge transfer and a capacity component by the electric double layer. The electric circuit thereof is expressed as a parallel circuit of the resistance and the capacity; and as the entire battery, this is expressed by the equivalent circuit in which the solution resistance and the parallel circuits of the negative and positive electrodes are connected in series. The fitting calculation is carried out to the Nyquist diagram measured by using this equivalent circuit so that each resistance component and capacity component can be estimated. The positive electrode resistance is equal to a diameter of the semicircle in the low frequency side of the obtained Nyquist diagram.

From the above, the alternating current impedance is measured as to the positive electrode thus prepared; and the fitting calculation is carried out to the obtained Nyquist diagram by using the equivalent circuit so that the positive electrode resistance can be estimated.

EXAMPLES

Hereunder, the present invention will be explained specifically by using Examples of the present invention; however, the present invention is not limited at all by these Examples. With regard to the positive electrode active material obtained by Examples of the present invention as well as the positive electrode mixed material paste and non-aqueous electrolyte secondary battery using this positive electrode active material, the performances thereof (stability of the paste, initial discharge capacity, positive electrode resistance, internal resistance, and discharge capacity retention rate) were evaluated by the following methods.

(Preparation of the Coin-Type Battery and Evaluation of the Battery Characteristics Thereof)

Figure 3:
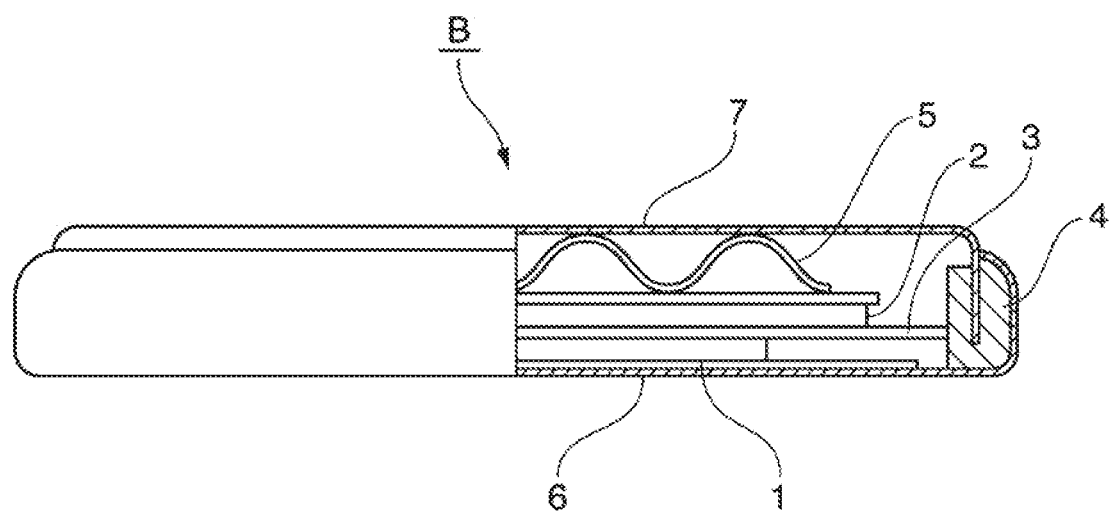
FIG. 3 illustrates a schematic sectional view of a coin-type battery used for the battery evaluation.

First, 52.5 mg of the positive electrode active material for a non-aqueous electrolyte secondary battery, 15 mg of acetylene black, and 7.5 mg of polytetrafluoroethylene resin (PTFE) were mixed and the resulting mixture was press-molded with the applied pressure of 100 MPa to the diameter of 11 mm and the thickness of 100 μm to prepare the positive electrode 1 (electrode for evaluation) as illustrated in FIG. 3. The positive electrode 1 thus prepared was dried at 120° C. in a vacuum dryer for 12 hours. Then, the 2032 coin-type battery B was prepared by using this positive electrode 1 in a globe box under an Ar atmosphere in which the dew point was control led at −80° C.

For the negative electrode 2, the negative electrode sheet, having graphite powder with the average particle diameter of about 20 μm and polyvinylidene fluoride applied onto copper foil, and having been stamped out to a disk-like shape with the diameter of 14 mm, was used. For the electrolyte solution, an equal amount mixture of ethylene carbonate (EC) and diethyl carbonate (DEC) (manufactured by Tomiyama Pure Chemical Industries, Ltd.) having 1-M $LiPF_6$ as the supporting electrolyte was used. For the separator 3, a polyethylene porous film having the film thickness of 25 μm was used. The coin-type battery B having the gasket 4 and the wave washer 5 was fabricated with the positive electrode can 6 and the negative electrode can 7 to the battery having a coin-like shape. The initial discharge capacity, the positive electrode resistance, and the cycle characteristic, these showing the performance of the coin-type battery B thus prepared, were evaluated as follows.
(Initial Discharge Capacity)

The initial discharge capacity was measured as follows. Namely, after the open circuit voltage (OCV) was stabilized by allowing to leave the coin-type battery B for about 24 hours after it was prepared, it was charged to the cut-off voltage of 4.3 V under the current density to the positive electrode of 0.1 $mA/cm^2$, and after 1 hour of pause, it was discharged to the cut-off voltage of 3.0 V, and thereby the capacity at this time was regarded as the initial discharge capacity.
(Positive Electrode Resistance)

The positive electrode resistance is measured by the alternate current impedance method using a frequency response analyzer and a potentiogalvanostat (1255B, manufactured by Solartron Analytical Inc.). The coin-type battery B is charged with the charge voltage of 4.1 V at 25° C., so that the Nyquist plot illustrated in FIG. 2 can be obtained. The Nyquist plot is expressed as the sum of the characteristic curves indicating the solution resistance, the negative electrode resistance and the capacity thereof, and the positive electrode resistance and the capacity thereof; and thus, on the basis of the Nyquist plot, the fitting calculation was carried out to calculate the positive electrode resistance value by using the equivalent circuit.
(Cycle Characteristic)

The cycle characteristic (discharge capacity retention rate) was evaluated by the capacity retention rate after the cycle test. In the cycle test, the initial discharge capacity was measured with keeping the temperature at 60° C., and after 10 minutes of pause, similarly to the measurement of the initial discharge capacity, the charge-discharge cycle was repeated for 500 cycles (charge-discharge) including measurement of the initial discharge capacity. The discharge capacity at the $500^{th}$ cycle was measured, and the capacity retention rate (%) was obtained as the percentage of the discharge capacity at the $500^{th}$ cycle with regard to the discharge capacity of the $1^{st}$ cycle (initial discharge capacity).
(Evaluation of the Output Characteristic at a Low Temperature)

By using the laminate cell C, the output characteristic at a low temperature was evaluated by measuring the battery's internal resistance ΔV at a low temperature with a current pause method. The evaluation method is as follows.

The laminate cell C used for the evaluation was prepared as follows. After the positive electrode active material, the conductive agent (acetylene black), and the binder (PVDF) were mixed with the mass ratio of 85:10:5, the solvent (NMP) was added to the mixture thus obtained so as to convert the positive electrode active material to paste. The paste thus obtained was applied to aluminum-made collector foil (thickness of 0.02 mm) with the conductive portion connected to outside being remained without the paste; and then, it was dried to prepare the positive electrode sheet 8 which has the positive electrode active material layer formed with 7 $mg/cm^2$ of the weight of the positive electrode active material per unit area.

The carbon powder (acetylene black) as the negative electrode active material was prepared as paste; and then, similarly to before, the paste was applied to the copper-made collector foil (thickness of 0.02 mm) to prepare the negative electrode sheet 9 which has the negative electrode active material layer formed with 5 $mg/cm^2$ of the weight of the negative electrode active material per unit area.

Between the positive electrode sheet 8 and the negative electrode sheet 9 thus prepared, the separator 10 formed of the polypropylene-made fine porous film (thickness of 20.7 m and porosity density of 43.9%) was interposed to form the laminate sheet. Then, this laminate sheet was interposed between two sheets of the aluminum laminate sheet 11 (thickness of 0.55 mm), and then, three sides of the aluminum laminate sheet 11 were thermally fused to form a thermally fused portion HS for sealing. In this way, the laminate cell having the composition as shown in FIG. 4 was fabricated.

Figure 4:
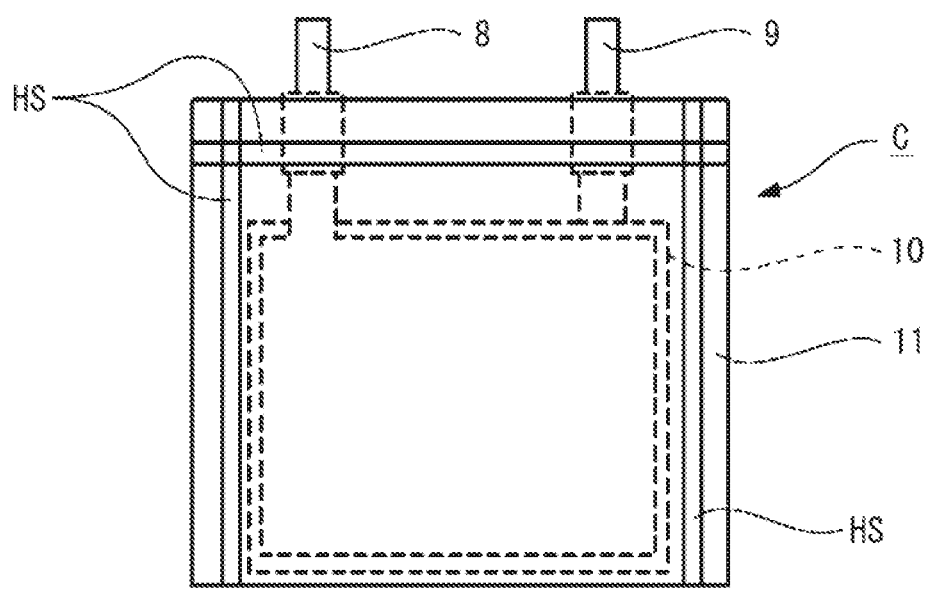
FIG. 4 illustrates a schematic explanatory drawing of the laminate cell used for the battery evaluation.

Thereafter, 260 μL of the electrolyte solution in which $LiPF_6$ (1 mol/L) was dissolved in a mixed solvent of ethylene carbonate, ethyl methyl carbonate, and dimethyl carbonate (volume ratio of 3:3:4) was injected into the laminate cell, this electrolyte solution having been manufactured by Ube Industries, Ltd.; and then, the remaining one side was thermally fused to prepare the laminate cell C as illustrated in FIG. 4.

Figure 5:
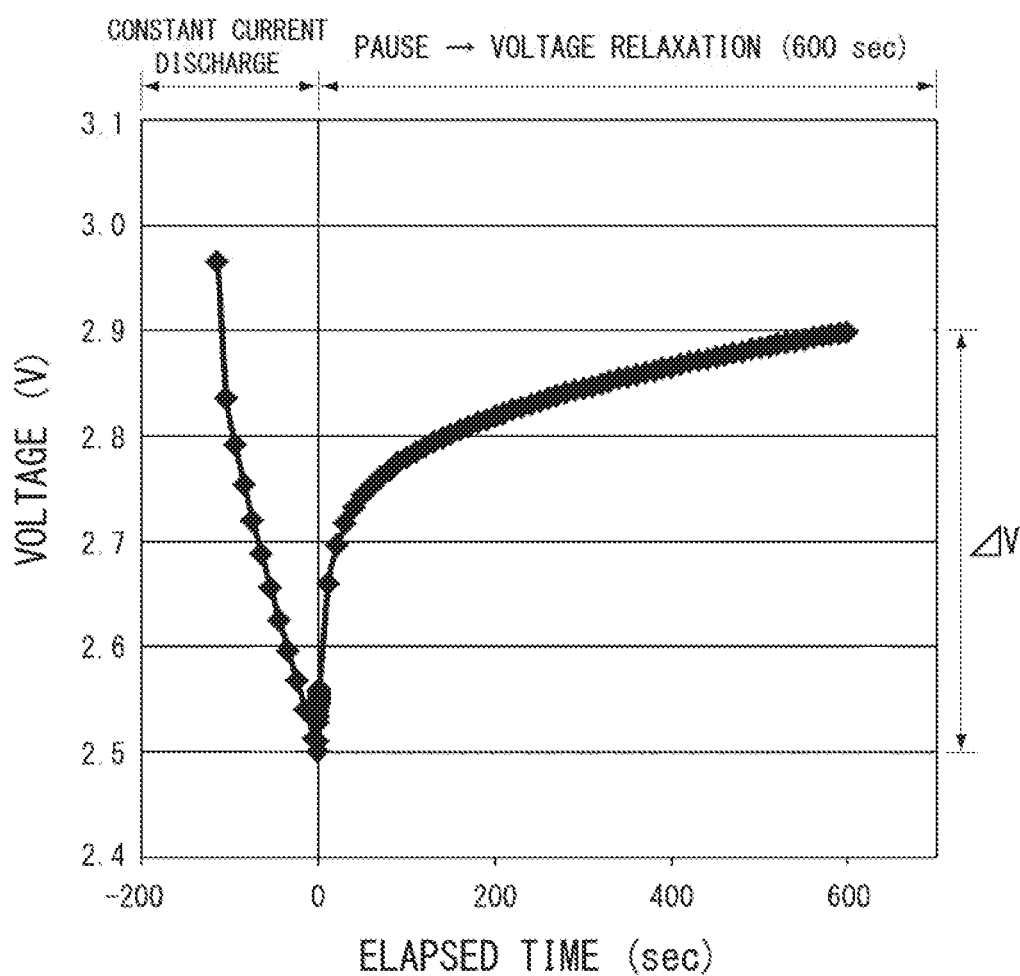
FIG. 5 illustrates an example of the ΔV measurement result by a current pause method used for the output evaluation at a low temperature.

The laminae cell C thus prepared was charged to 4.2 V at the temperature of −20° C., and then, it was discharged to 2.5 V with 0.2 C, and the circuit was opened, whereby the voltage change (ΔV) before and after the voltage relaxation for 600 seconds was calculated. When the electric current at the time of discharge is same, the difference ΔV can be understood directly as the difference in the resistance. Namely, it can be understood that when ΔV is smaller, the resistance is lower; and thus, the value of ΔV was evaluated as the direct current resistance under a low temperature condition. Example of the measurement result of the current pause method is illustrated in FIG. 5.
(Viscosity Stability of the Positive Electrode Mixed Material Paste)

By using a planetary motion kneader, 25.0 g of the positive electrode active material, 1.5 g of carbon powder as the conductive agent, 2.9 g of polyvinylidene fluoride (PVDF), and N-methyl-2-pyrrolidone (NMP) were mixed to obtain the positive electrode mixed material paste. An addition amount of N-methyl-2-pyrrolidone (NMP) was adjusted such that the viscosity by the viscosity measurement method using a vibration-type viscometer stipulated in JIS Z 8803: 2011 fell within the range of 1.5 Pa·s to 2.5 Pa·s. The paste thus obtained was stored for 76 hours; and then, the viscosity ratio after and before the storage (paste viscosity after storage for 76 hours/paste viscosity immediately after preparation) was evaluated. The viscosity was measured with a vibration-type viscometer (VM10A, manufactured by Sekonic Corp.).

(Water Content)

This was measured with a Karl Fischer moisture meter under the vaporization temperature condition of 300° C.

(Measurement of the Excess LiOH Amount and the Excess $Li_2CO_3$ Amount)

The excess LiOH amount was evaluated by titration of the Li that was eluted from the positive electrode active material. To 1 g of the obtained positive electrode active material, 10 mL of pure water was added, and then, after the resulting mixture was stirred for 1 minute, it was filtrated. With measuring pH of the filtrate, 1 mol/L of hydrochloric acid was added to the filtrate; and from the emerged neutralization points, the compound state of the eluted lithium was analyzed, and the amount of the excess lithium was evaluated. In this titration, the first stage neutralization point (shoulder) from the high alkaline side indicates the LiOH amount, and the second stage neutralization point indicates the $Li_2CO_3$ amount.

EXAMPLE 1

The fired powder of the lithium-metal composite oxide represented by $Li_{1.20}Ni_{0.35}Co_{0.35}Mn_{0.30}O_2$ (average particle diameter: 5.07 µm, [(d90–d10)/average particle diameter]: 0.42, porosity: 14.2%, and specific surface area: 2.50 g/m$^2$) was used as a base material, the fired powder having been obtained by a publicly known technology in which the oxide powder mainly composed of Ni and lithium hydroxide were mixed and resulting mixture was fired. To the fired powder as the base material, water was added with the amount of 1.5% by mass with regard to the fired powder; and then, they were further mixed. Thereafter, the resulting mixture was dried at 150° C. under an air atmosphere for 12 hours to obtain the positive electrode active material. The production conditions as well as measurement and evaluation results of the positive electrode active material are summarized in Table 1 and Table 2. The specific surface area of the positive electrode active material was obtained by the BET method with nitrogen gas adsorption.

[Measurement of pH]

After 5 g of the obtained positive electrode active material was dispersed into 100 mL of pure water, the resulting dispersion solution was statically left for 10 minutes; and then, pH of the supernatant thereof at 25° C. was measured.

[Positive Electrode Mixed Material Paste]

Viscosity of the positive electrode mixed material paste prepared by the above-described method using the obtained positive electrode active material was measured.

[Battery Evaluation]

Battery characteristics of the coin-type battery B and the laminate cell C, having the positive electrode prepared by the above-described method using the obtained positive electrode active material, were evaluated.

EXAMPLE 2

The positive electrode active material was obtained and evaluated with the same method as Example 1 except that the addition amount of water was 3% by mass. Evaluation results thereof are summarized in Table 1 and Table 2.

EXAMPLE 3

The positive electrode active material was obtained and evaluated with the same method as Example 1 except that the addition amount of water was 5% by mass. Evaluation results thereof are summarized in Table 1 and Table 2.

EXAMPLE 4

The positive electrode active material was obtained and evaluated with the same method as Example 1 except that the addition amount of water was 7% by mass. Evaluation results thereof are summarized in Table 1 and Table 2.

EXAMPLE 5

The positive electrode active material was obtained and evaluated with the same method as Example 1 except that the addition amount of water was 14% by mass. Evaluation results thereof are summarized in Table 1 and Table 2.

EXAMPLE 6

The positive electrode active material was obtained and evaluated with the same method as Example 1 except that the addition amount of water was 30% by mass. Evaluation results thereof are summarized in Table 1 and Table 2.

EXAMPLE 7

The positive electrode active material was obtained and evaluated with the same method as Example 1 except that the fired powder as the base material was placed in a tray, and then, by using a spray bottle, mixed with water while adding water by spraying with the amount thereof being 3% by mass with regard to the lithium-metal composite oxide powder under the condition to give the average droplet diameter of about 300 µm. Evaluation results thereof are summarized in Table 1 and Table 2.

EXAMPLE 8

The positive electrode active material was obtained and evaluated with the same method as Example 1 except that the fired powder as the base material was put in the Henschel mixer (FM20C/I; manufactured by Nippon Coke & Engineering Co., Ltd.), and with mixing and stirring the fired powder in the tank by using a stirring blade, by using a sprayer, water was added with the amount thereof being 3% by mass with regard to the lithium-metal composite oxide powder under the condition to give the average droplet diameter of about 300 µm, and then the resulting mixture was dried at 130° C. for 2 hours under the evacuated atmosphere of about –90 kPa. Evaluation results thereof are summarized in Table 1 and Table 2.

EXAMPLE 9

The positive electrode active material was obtained and evaluated with the same method as Example 1 except that the base material was changed to the fired powder of the lithium-metal composite oxide having the composition represented by $Li_{1.20}(Ni_{0.35}Co_{0.35}Mn_{0.30})_{0.995}W_{0.005}O_2$ (average particle diameter: 4.97 µm, [(d90–d10)/average particle diameter]: 0.41, and porosity: 15.6%). Evaluation results thereof are summarized in Table 1 and Table 2. The above-described composition of the base material indicates that the molar ratio of Ni, Co, and Mn (Ni:Co:Mn) is 0.35:0.35:0.30, the molar ratio of the sum of Ni, Co, and Mn to W (Ni+Co+Mn:W) is 0.995:0.005, and the molar ratio of Li to Me (sum of Ni, Co, Mn, and W) is 1.20:1 (Li:Me).

EXAMPLE 10

The positive electrode active material was obtained and evaluated with the same method as Example 7 except that the addition amount of water was 3% by mass. Evaluation results thereof are summarized in Table 1 and Table 2.

EXAMPLE 11

The positive electrode active material was obtained and evaluated with the same method as Example 7 except that the addition amount of water was 5% by mass. Evaluation results thereof are summarized in Table 1 and Table 2.

EXAMPLE 12

The positive electrode active material was obtained and evaluated with the same method as Example 7 except that the addition amount of water was 7% by mass. Evaluation results thereof are summarized in Table 1 and Table 2.

EXAMPLE 13

The positive electrode active material was obtained and evaluated with the same method as Example 7 except that the addition amount of water was 14% by mass. Evaluation results thereof are summarized in Table 1 and Table 2.

EXAMPLE 14

The positive electrode active material was obtained and evaluated with the same method as Example 7 except that the addition amount of water was 30% by mass. Evaluation results thereof are summarized in Table 1 and Table 2.

EXAMPLE 15

The positive electrode active material was obtained and evaluated with the same method as Example 9 except that the fired powder as the base material, was placed in a tray, and then, by using a spray bottle, mixed with water while adding the water by spraying with the amount thereof being 3% by mass with regard to the lithium-metal composite oxide powder under the condition to give the average droplet diameter of about 300 µm. Evaluation results thereof are summarized in Table 1 and Table 2.

EXAMPLE 16

The positive electrode active material was obtained and evaluated with the same method as Example 9 except that the fired powder as the base material, was put in the Henschel mixer (FM20C/I; manufactured by Nippon Coke & Engineering Co., Ltd.), and with mixing and stirring the fired powder in the tank by using a stirring blade, by using a sprayer, water was added with the amount thereof being 3% by mass with regard to the lithium-metal composite oxide powder under the condition to give the average droplet diameter of about 300 µm, and then the resulting mixture was dried at 130° C. for 2 hours under the evacuated atmosphere of about −90 kPa. Evaluation results thereof are summarized in Table 1 and Table 2.

Comparative Example 1

The positive electrode active material was obtained and evaluated with the same method as Example 1 except that the base material was used as the positive electrode active material as it was. Evaluation results thereof are summarized in Table 1 and Table 2.

Comparative Example 2

The positive electrode active material was obtained and evaluated with the same method as Example 7 except that the base material was used as the positive electrode active material as it was. Evaluation results thereof are summarized in Table 1 and Table 2.

TABLE 1

| | | Mixing | | Drying | |
|---|---|---|---|---|---|
| | | Water Addition | Water addition amount per | | |
| | Active material composition | amount wt % | surface area g/m$^2$ | Atmosphere | Temperature ° C. |
| Example 1 | Li$_{1.20}$Ni$_{0.35}$Co$_{0.35}$Mn$_{0.30}$O$_2$ | 1.5 | 0.006 | Air atmosphere | 150 |
| Example 2 | Li$_{1.20}$Ni$_{0.35}$Co$_{0.35}$Mn$_{0.30}$O$_2$ | 3 | 0.012 | Air atmosphere | 150 |
| Example 3 | Li$_{1.20}$Ni$_{0.35}$Co$_{0.35}$Mn$_{0.30}$O$_2$ | 5 | 0.020 | Air atmosphere | 150 |
| Example 4 | Li$_{1.20}$Ni$_{0.35}$Co$_{0.35}$Mn$_{0.30}$O$_2$ | 7 | 0.028 | Air atmosphere | 150 |
| Example 5 | Li$_{1.20}$Ni$_{0.35}$Co$_{0.35}$Mn$_{0.30}$O$_2$ | 14 | 0.056 | Air atmosphere | 150 |
| Example 6 | Li$_{1.20}$Ni$_{0.35}$Co$_{0.35}$Mn$_{0.30}$O$_2$ | 30 | 0.120 | Air atmosphere | 150 |
| Example 7 | Li$_{1.20}$Ni$_{0.35}$Co$_{0.35}$Mn$_{0.30}$O$_2$ | 3* | 0.012 | Air atmosphere | 150 |
| Example 8 | Li$_{1.20}$Ni$_{0.35}$Co$_{0.35}$Mn$_{0.30}$O$_2$ | 3* | 0.012 | Evacuated atmosphere | 150 |
| Example 9 | Li$_{1.20}$(Ni$_{0.35}$Co$_{0.35}$Mn$_{0.30}$)$_{0.995}$W$_{0.005}$O$_2$ | 1.5 | 0.006 | Air atmosphere | 150 |
| Example 10 | Li$_{1.20}$(Ni$_{0.35}$Co$_{0.35}$Mn$_{0.30}$)$_{0.995}$W$_{0.005}$O$_2$ | 3 | 0.012 | Air atmosphere | 150 |

TABLE 1-continued

| | | | | | |
|---|---|---|---|---|---|
| Example 11 | $Li_{1.20}(Ni_{0.35}Co_{0.35}Mn_{0.30})_{0.995}W_{0.005}O_2$ | 5 | 0.020 | Air atmosphere | 150 |
| Example 12 | $Li_{1.20}(Ni_{0.35}Co_{0.35}Mn_{0.30})_{0.995}W_{0.005}O_2$ | 7 | 0.029 | Air atmosphere | 150 |
| Example 13 | $Li_{1.20}(Ni_{0.35}Co_{0.35}Mn_{0.30})_{0.995}W_{0.005}O_2$ | 14 | 0.057 | Air atmosphere | 150 |
| Example 14 | $Li_{1.20}(Ni_{0.35}Co_{0.35}Mn_{0.30})_{0.995}W_{0.005}O_2$ | 30 | 0.123 | Air atmosphere | 150 |
| Example 15 | $Li_{1.20}(Ni_{0.35}Co_{0.35}Mn_{0.30})_{0.995}W_{0.005}O_2$ | 3* | 0.012 | Air atmosphere | 150 |
| Example 16 | $Li_{1.20}(Ni_{0.35}Co_{0.35}Mn_{0.30})_{0.995}W_{0.005}O_2$ | 3* | 0.012 | Evacuated atmosphere | 130 |
| C. Example 1 | $Li_{1.20}Ni_{0.35}Co_{0.35}Mn_{0.30}O_2$ | 0 | 0 | Air atmosphere | 150 |
| C. Example 2 | $Li_{1.20}(Ni_{0.35}Co_{0.35}Mn_{0.30})_{0.995}W_{0.005}O_2$ | 0 | 0 | Air atmosphere | 150 |

| | Positive electrode active material | | | | | |
|---|---|---|---|---|---|---|
| | pH — | Water content wt % | BET specific surface area $m^2/g$ | Excess LiOH wt % | Excess $Li_2CO_3$ wt % | Excess LiOH/excess $Li_2CO_3$ — | Excess $Li_2CO_3$ per surface area $10^{-2} \times g/m^2$ |
| Example 1 | 11.8 | 0.25 | 2.81 | 0.103 | 0.395 | 0.261 | 0.141 |
| Example 2 | 11.8 | 0.26 | 2.83 | 0.115 | 0.415 | 0.277 | 0.147 |
| Example 3 | 11.8 | 0.27 | 2.77 | 0.106 | 0.422 | 0.251 | 0.152 |
| Example 4 | 11.8 | 0.27 | 2.56 | 0.112 | 0.425 | 0.264 | 0.166 |
| Example 5 | 11.8 | 0.28 | 2.89 | 0.106 | 0.456 | 0.232 | 0.158 |
| Example 6 | 11.7 | 0.27 | 2.95 | 0.113 | 0.476 | 0.237 | 0.161 |
| Example 7 | 11.7 | 0.26 | 2.95 | 0.101 | 0.423 | 0.239 | 0.143 |
| Example 8 | 11.7 | 0.15 | 3.01 | 0.098 | 0.427 | 0.230 | 0.142 |
| Example 9 | 11.7 | 0.26 | 2.72 | 0.071 | 0.386 | 0.185 | 0.142 |
| Example 10 | 11.7 | 0.27 | 2.75 | 0.075 | 0.395 | 0.190 | 0.144 |
| Example 11 | 11.7 | 0.25 | 2.77 | 0.082 | 0.401 | 0.204 | 0.145 |
| Example 12 | 11.7 | 0.27 | 2.48 | 0.085 | 0.413 | 0.206 | 0.167 |
| Example 13 | 11.7 | 0.26 | 2.77 | 0.073 | 0.430 | 0.171 | 0.155 |
| Example 14 | 11.6 | 0.26 | 2.89 | 0.064 | 0.364 | 0.174 | 0.126 |
| Example 15 | 11.6 | 0.26 | 2.88 | 0.071 | 0.401 | 0.177 | 0.139 |
| Example 16 | 11.6 | 0.15 | 2.95 | 0.064 | 0.400 | 0.160 | 0.136 |
| C. Example 1 | 12.0 | 0.23 | 2.50 | 0.165 | 0.321 | 0.514 | 0.128 |
| C. Example 2 | 11.9 | 0.21 | 2.44 | 0.147 | 0.300 | 0.492 | 0.123 |

*Water is added by spraying.

TABLE 2

| | | Secondary battery | | | |
|---|---|---|---|---|---|
| | Paste Viscosity ratio — | Initial discharge capacity mAh/g | Positive electrode resistance SOC: 20% Ω | Internal resistance @ −20° C. 2.5 V ΔV | Capacity retention rate after 500 cycle @50° C. % |
| Example 1 | 0.95 | 156.3 | 5.01 | 0.565 | 90.7 |
| Example 2 | 0.92 | 156.4 | 4.98 | 0.550 | 90.5 |
| Example 3 | 0.89 | 156.1 | 5.01 | 0.562 | 90.0 |
| Example 4 | 0.89 | 155.2 | 5.06 | 0.574 | 89.9 |
| Example 5 | 0.91 | 156.4 | 5.03 | 0.570 | 90.2 |
| Example 6 | 0.90 | 156.6 | 5.08 | 0.581 | 90.1 |
| Example 7 | 0.89 | 156.8 | 4.95 | 0.545 | 90.4 |
| Example 8 | 0.88 | 157.0 | 4.93 | 0.541 | 90.6 |
| Example 9 | 0.56 | 154.9 | 4.75 | 0.491 | 88.3 |
| Example 10 | 0.52 | 155.2 | 4.70 | 0.475 | 90.1 |
| Example 11 | 0.47 | 155.0 | 4.76 | 0.492 | 90.4 |
| Example 12 | 0.45 | 154.7 | 4.80 | 0.495 | 86.4 |
| Example 13 | 0.44 | 155.1 | 4.77 | 0.497 | 87.7 |
| Example 14 | 0.64 | 155.3 | 4.81 | 0.501 | 87.9 |

TABLE 2-continued

| | Paste Viscosity ratio — | Secondary battery | | | |
|---|---|---|---|---|---|
| | | Initial discharge capacity mAh/g | Positive electrode resistance SOC: 20% Ω | Internal resistance @ −20° C. 2.5 V ΔV | Capacity retention rate after 500 cycle @50° C. % |
| Example 15 | 0.46 | 155.5 | 4.65 | 0.473 | 90.2 |
| Example 16 | 0.45 | 155.7 | 4.62 | 0.471 | 90.1 |
| C. Example 1 | 6.2 | 153.2 | 5.21 | 0.721 | 88.2 |
| C. Example 2 | 6 | 151.7 | 4.92 | 0.622 | 85.4 |

(Evaluation Results)

The secondary batteries using the positive electrode active materials of Examples exhibit excellent results in all of the initial discharge capacity, the positive electrode resistance, the battery's internal resistance, and the capacity retention rate as compared with the secondary battery using the positive electrode active materials without being mixed with water in Comparative Examples. In Examples 9 to 16 in which the lithium-metal composite oxide including W was used as the fired powder, the positive electrode resistance and the battery's internal resistance were further decreased. Especially, the battery's internal resistance, which indicates the output characteristic at a low temperature, was significantly decreased.

In Examples 1 to 3, 7, 8, 9 to 11, 15, and 16 in which the amount of water to be mixed was optimized, the withdrawn amount of lithium was optimized as compared with Examples 4 to 6 and 12 to 14 which had the same compositions, so that while keeping the low viscosity ratio of the positive electrode mixed material paste, the output characteristic thereof was improved as compared with Examples which had the same composition. Especially in Examples 7, 8, 15, and 16 in which water was added with being sprayed, the output characteristic was improved furthermore.

In Examples 1 to 16 in which water was mixed, as compared with Comparative Examples 1 and 2 in which water was not added, a content of the excess LiOH was decreased while a content of the excess $Li_2CO_3$ was increased, resulting in $LiOH/Li_2CO_3$ of 0.45 or lower. This is presumably because the excess LiOH in the fired powder was converted to $Li_2CO_3$ in the water addition process and the drying process thereafter.

In the positive electrode mixed material paste using the positive electrode active material of Examples, as compared with the positive electrode mixed material paste of Comparative Examples, the viscosity ratio value is lower so that the viscosity stability is improved.

So far as the relevant laws permit, contents of all the references cited in Japanese Patent Application Nos. 2016-060745, 2016-118644, and 2016-248296 as well as in the embodiments described above are cited so as to make them a part of the present description.

DESCRIPTION OF REFERENCE SIGNS

B Coin-type battery
1 Positive electrode (electrode for evaluation)
2 Negative electrode
3 Separator
4 Gasket
5 Wave washer
6 Positive electrode can
7 Negative electrode can
C Laminate cell
8 Positive electrode sheet
9 Negative electrode sheet
10 Separator
11 Aluminum laminate sheet
HS Thermally fused portion

The invention claimed is:

1. A positive electrode active material for a non-aqueous electrolyte secondary battery, wherein
the positive electrode active material for a non-aqueous electrolyte secondary battery comprises a lithium-metal composite oxide powder having a crystal structure of a layered structure;
the lithium-metal composite oxide powder is represented by general formula (1): $Li_sNi_{1-x-y-z}Co_xMn_yM^1_zO_2$ (where $0.05 \leq x \leq 0.35$, $0 \leq y \leq 0.35$, $0 \leq z \leq 0.10$, and $0.95 \leq s \leq 1.50$; and $M^1$ represents at least one element selected from V, Mg, Mo, Nb, Ti, W, and Al) and comprises secondary particles formed by agglomeration of primary particles thereof,
pH of a supernatant obtained after 5 g of the positive electrode active material is dispersed into 100 mL of pure water followed by statically leaving the resultant dispersion solution for a period of 10 minutes is at least 11.5 and up to 11.9 as measured at 25° C.;
an amount of excess LiOH is 0.05% by mass or more based on an entire mass of the positive electrode active material, and an amount of excess $Li_2CO_3$ is 0.364% by mass or more based on the entire mass of the positive electrode active material,
a mass ratio of the excess LiOH to the excess $Li_2CO_3$ (excess LiOH/excess $Li_2CO_3$) quantified by a titration method is 0.277 or lower,
the mass ratio of the excess LiOH to the excess $Li_2CO_3$ (excess LiOH/excess $Li_2CO_3$) is 0.18 or higher,
the amount of the excess $Li_2CO_3$ is $0.157 \times 10^{-2}$ g/m$^2$ or less with regard to a surface area of the positive electrode active material, and
a specific surface area of the positive electrode active material is at least 1 m$^2$/g and up to 3.01 m$^2$/g.

2. The positive electrode active material for a non-aqueous electrolyte secondary battery according to claim 1, wherein an average particle diameter thereof is in a range of at least 3 μm and up to 15 μm, and [(d90-d10)/average particle diameter] that is an indicator to show spread of the particle size distribution is 0.7 or smaller.

3. The positive electrode active material for a non-aqueous electrolyte secondary battery according to claim 1, wherein a ratio of an area occupied by a void measured in observation of a section of the lithium-metal composite oxide powder is at least 4.5% and up to 60% with regard to a sectional area of an entire lithium-metal composite oxide particle.

4. The positive electrode active material for a non-aqueous electrolyte secondary battery according to claim 1, wherein the lithium-metal composite oxide powder is represented by general formula (2): $Li_sNi_{1-x-y-z-t}Co_xMn_yM^2_zW_tO_2$, provided that $0.05 \le x \le 0.35$, $0 \le y \le 0.35$, $0 \le z \le 0.10$, $0.95 \le s \le 1.50$, $0.0001 \le t \le 0.03$, and $0.0001 \le z+t \le 0.10$; and $M^2$ represents at least one element selected from V, Mg, Mo, Nb, Ti, and Al.

5. A positive electrode mixed material paste for a non-aqueous electrolyte secondary battery, wherein the paste comprises the positive electrode active material for a non-aqueous electrolyte secondary battery according to claim 1.

6. A non-aqueous electrolyte secondary battery, wherein the battery has a positive electrode comprising the positive electrode active material for a non-aqueous electrolyte secondary battery according to claim 1.

7. The positive electrode active material for a non-aqueous electrolyte secondary battery according to claim 1, wherein a positive electrode mixed material paste which comprises the positive electrode active material satisfies the following viscosity stability requirement:
   when the positive electrode mixed material paste is prepared by mixing 25.0 g of the positive electrode active material, 1.5 g of carbon powder as a conductive agent, 2.9 g of polyvinylidene fluoride (PVDF), and N-methyl-2-pyrrolidone (NMP), such that a viscosity of the prepared positive electrode mixed material paste falls within a range of 1.5 Pa·s to 2.5 Pa·s, and is immediately stored for 76 hours, a ratio of the viscosity measured after the 76-hour storage to the viscosity measured before the 76-hour storage (the viscosity after the 76-hour storage/the viscosity before the 76-hour storage) is 0.95 or less.

8. The positive electrode active material for a non-aqueous electrolyte secondary battery according to claim 1, wherein the lithium-metal composite oxide powder is represented by general formula (2): $Li_sNi_{1-x-y-z}Co_xMn_yM^1_zO_2$ (where $0.05 \le x \le 0.35$, $0 < y \le 0.35$, $0 \le z \le 0.10$, and $0.95 \le s \le 1.50$, and $M^1$ represents at least one element selected from V, Mg, Mo, Nb, Ti, W, and Al).

9. A method for manufacturing a positive electrode active material for a non-aqueous electrolyte secondary battery according to claim 1, the method comprising:
   mixing fired powder containing a lithium-metal composite oxide having a crystal structure of a layered structure with water; and
   drying the resultant mixture obtained by the mixing, wherein
   the fired powder is represented by general formula (1): $Li_sNi_{1-x-y-z}Co_xMn_yM^1_zO_2$ (where $0.05 \le x \le 0.35$, $0 \le y \le 0.35$, $0 \le z \le 0.10$, and $0.95 \le s \le 1.50$; and $M^1$ represents at least one element selected from V, Mg, Mo, Nb, Ti, W, and Al) and comprises secondary particles formed by agglomeration of primary particles thereof, and
   the water is mixed thereto with an amount with which pH of a supernatant obtained after 5 g of the obtained positive electrode active material is dispersed into 100 mL of pure water followed by statically leaving the resultant dispersion solution for a period of 10 minutes falls within a range of at least 11.5 and up to 11.9 as measured at 25° C.

10. The method for manufacturing a positive electrode active material for a non-aqueous electrolyte secondary battery according to claim 9, wherein at the time when the fired powder is mixed with water, the water is mixed by spraying in droplets having a size of 1 μm to 2,000 μm.

11. The method for manufacturing a positive electrode active material for a non-aqueous electrolyte secondary battery according to claim 9, wherein the water is mixed with the amount in a range of at least 1% by mass and up to 35% by mass with regard to the fired powder.

12. The method for manufacturing a positive electrode active material for a non-aqueous electrolyte secondary battery according to claim 9, wherein the water is mixed with the amount in a range of at least 0.003 g/m² and up to 0.025 g/m² with regard to the surface area of the fired powder.

13. The method for manufacturing a positive electrode active material for a non-aqueous electrolyte secondary battery according to claim 9, wherein the water is mixed with the amount in a range of at least 1% by mass to up to 6% by mass with regard to the fired powder.

14. The method for manufacturing a positive electrode active material for a non-aqueous electrolyte secondary battery according to claim 9, wherein an average particle diameter of the fired powder is in a range of at least 3 μm and up to 15 μm, and [(d90-d10)/average particle diameter] that is an indicator to show spread of the particle size distribution is 0.7 or smaller.

15. The method for manufacturing a positive electrode active material for a non-aqueous electrolyte secondary battery according to claim 9, wherein a ratio of the area occupied by a void measured by observation of a section of the fired powder is at least 4.5% and up to 60% with regard to an entire sectional area of the fired powder.

16. The method for manufacturing a positive electrode active material for a non-aqueous electrolyte secondary battery according to claim 9, wherein the drying is carried out at least 100° C. and up to 300° C.

17. The method for manufacturing a positive electrode active material for a non-aqueous electrolyte secondary battery according to claim 9, wherein the fired powder is represented by general formula (2): $Li_sNi_{1-x-y-z-t}Co_xMn_yM^2_zW_tO_2$, provided that $0.05 \le x \le 0.35$, $0 \le y \le 0.35$, $0 \le z \le 0.10$, $0.95 \le s \le 1.50$, $0.0001 \le t \le 0.03$, and $0.0001 \le z+t \le 0.10$; and $M^2$ represents at least one element selected from V, Mg, Mo, Nb, Ti, and Al.

* * * * *